(12) United States Patent
Benson et al.

(10) Patent No.: US 11,093,852 B2
(45) Date of Patent: Aug. 17, 2021

(54) SYSTEMS AND METHODS FOR RECOGNIZING A DEVICE AND/OR AN INSTANCE OF AN APP INVOKED ON A DEVICE

(71) Applicant: ACCERTIFY, INC., Itasca, IL (US)

(72) Inventors: Glenn S. Benson, Newton, MA (US); Kasun Maduranga Samarasinghe, Quincy, MA (US)

(73) Assignee: ACCERTIFY, INC., Itasca, IL (US)

( * ) Notice: Subject to any disclaimer, the term of this patent is extended or adjusted under 35 U.S.C. 154(b) by 816 days.

(21) Appl. No.: 15/297,889

(22) Filed: Oct. 19, 2016

(65) Prior Publication Data
US 2018/0107923 A1 Apr. 19, 2018

(51) Int. Cl.
*G06N 20/00* (2019.01)
*G06N 20/10* (2019.01)
(Continued)

(52) U.S. Cl.
CPC .............. *G06N 20/00* (2019.01); *G06N 20/10* (2019.01); *H04L 63/0876* (2013.01);
(Continued)

(58) Field of Classification Search
CPC ......... H04W 12/00; G06N 20/00; G06N 3/08; G06N 5/02; G06N 5/022; H04L 63/0876; G06F 21/44
See application file for complete search history.

(56) References Cited

U.S. PATENT DOCUMENTS

| 6,041,133 | A | 3/2000 | Califano et al. |
| 6,185,316 | B1 | 2/2001 | Buffam |

(Continued)

FOREIGN PATENT DOCUMENTS

WO    WO-2016077157 A1    5/2016

OTHER PUBLICATIONS

Mayrhofer et al. "Shake well before use: Intuitive and secure pairing of mobile devices." IEEE Transactions on Mobile Computing 8.6 (2009): 792-806. (Year: 2009).*

(Continued)

*Primary Examiner* — Kamran Afshar
*Assistant Examiner* — Randall K. Baldwin
(74) *Attorney, Agent, or Firm* — Sterne, Kessler, Goldstein & Fox P.L.L.C.

(57) ABSTRACT

A system of classifying devices and/or app instances a new or returning divides attributes generated from observations received from an uncharacterized device/software app into base-fingerprint attributes and predictor attributes, where the two kinds of attributes have different longevities. Predictor attribute tuples from attribute tuples having the same base fingerprint as the base fingerprint corresponding to the uncharacterized device/app, and the predictor attribute tuple corresponding to the uncharacterized device/app are analyzed using a machine learned predictor function to obtain a final fingerprint. Machine learning techniques such as logistic regression, support vector machine, and artificial neural network can provide a predictor function that can decrease the conflict rate of the final fingerprint and, hence, the utility thereof, without significantly affecting the accuracy of classification.

30 Claims, 4 Drawing Sheets

(51) Int. Cl.
| | |
|---|---|
| *H04W 12/79* | (2021.01) |
| *H04L 29/06* | (2006.01) |
| *H04W 12/03* | (2021.01) |
| *H04W 12/065* | (2021.01) |
| *H04W 12/084* | (2021.01) |
| *H04W 12/122* | (2021.01) |

(52) U.S. Cl.
CPC ......... *H04W 12/03* (2021.01); *H04W 12/065* (2021.01); *H04W 12/084* (2021.01); *H04W 12/122* (2021.01); *H04W 12/79* (2021.01)

(56) References Cited

U.S. PATENT DOCUMENTS

| | | | |
|---|---|---|---|
| 7,272,728 | B2 | 9/2007 | Pierson et al. |
| 8,213,907 | B2 | 7/2012 | Etchegoyen |
| 8,285,994 | B2 | 10/2012 | Shah et al. |
| 8,312,157 | B2 | 11/2012 | Markus et al. |
| 8,316,421 | B2 | 11/2012 | Etchegoyen |
| 8,590,021 | B2 | 11/2013 | Steeves et al. |
| 8,682,812 | B1* | 3/2014 | Ranjan ................ H04L 63/1425 706/12 |
| 8,739,278 | B2* | 5/2014 | Varghese ............ H04L 63/0876 726/22 |
| 8,817,984 | B2 | 8/2014 | Miller et al. |
| 8,961,619 | B2 | 2/2015 | Gum |
| 9,088,601 | B2* | 7/2015 | Friedrichs ............. G06F 21/564 |
| 9,165,124 | B1 | 10/2015 | Gurevich et al. |
| 9,294,448 | B2 | 3/2016 | Miller et al. |
| 9,444,839 | B1* | 9/2016 | Faulkner ............... H04L 63/168 |
| 9,559,852 | B2 | 1/2017 | Miller et al. |
| 9,722,804 | B2 | 8/2017 | Miller et al. |
| 9,753,796 | B2* | 9/2017 | Mahaffey ............ G06F 11/0766 |
| 2002/0044651 | A1 | 4/2002 | Tuvell |
| 2005/0278542 | A1 | 12/2005 | Pierson et al. |
| 2006/0036862 | A1 | 2/2006 | Tuvell et al. |
| 2006/0041752 | A1 | 2/2006 | Tuvell et al. |
| 2006/0050869 | A1 | 3/2006 | Tuvell et al. |
| 2006/0282660 | A1 | 12/2006 | Varghese et al. |
| 2007/0240217 | A1 | 10/2007 | Tuvell et al. |
| 2007/0240218 | A1 | 10/2007 | Tuvell et al. |
| 2007/0240219 | A1 | 10/2007 | Tuvell et al. |
| 2007/0240220 | A1 | 10/2007 | Tuvell et al. |
| 2007/0240221 | A1 | 10/2007 | Tuvell et al. |
| 2007/0240222 | A1 | 10/2007 | Tuvell et al. |
| 2008/0086773 | A1 | 4/2008 | Tuvell et al. |
| 2008/0086776 | A1 | 4/2008 | Tuvell et al. |
| 2008/0196104 | A1 | 8/2008 | Tuvell et al. |
| 2009/0025084 | A1 | 1/2009 | Siourthas et al. |
| 2009/0089869 | A1* | 4/2009 | Varghese ............ G06Q 20/4014 726/7 |
| 2010/0229224 | A1 | 9/2010 | Etchegoyen |
| 2010/0296653 | A1 | 11/2010 | Richardson |
| 2010/0332400 | A1 | 12/2010 | Etchegoyen |
| 2011/0082768 | A1 | 4/2011 | Eisen |
| 2011/0093503 | A1 | 4/2011 | Etchegoyen |
| 2011/0179484 | A1 | 7/2011 | Tuvell et al. |
| 2012/0030771 | A1 | 2/2012 | Pierson et al. |
| 2012/0042029 | A1 | 2/2012 | Tuvell et al. |
| 2012/0201381 | A1 | 8/2012 | Miller et al. |
| 2012/0210423 | A1* | 8/2012 | Friedrichs ............. G06F 21/564 726/22 |
| 2013/0340052 | A1 | 12/2013 | Jokobsson |
| 2014/0115160 | A1 | 4/2014 | Tuvell et al. |
| 2015/0033027 | A1 | 1/2015 | Miller et al. |
| 2015/0295926 | A1* | 10/2015 | Husain ................ H04L 63/1441 726/6 |
| 2015/0347753 | A1 | 12/2015 | Tuvell et al. |
| 2016/0012227 | A1 | 1/2016 | Tuvell et al. |
| 2016/0140956 | A1* | 5/2016 | Yu ........................ G10L 15/16 704/240 |
| 2016/0164866 | A1* | 6/2016 | Oberheide .......... H04L 63/0861 726/7 |
| 2016/0204948 | A1 | 7/2016 | Miller et al. |
| 2016/0261416 | A1 | 9/2016 | Miller et al. |
| 2017/0076023 | A1* | 3/2017 | Cormier ................. G06F 30/20 |
| 2018/0046918 | A1* | 2/2018 | Moon ................. G06F 9/44552 |
| 2018/0374374 | A1* | 12/2018 | Watson .................. G06Q 50/20 |

OTHER PUBLICATIONS

Sarraute et al. "Using neural networks to improve classical operating system fingerprinting techniques." arXiv preprint arXiv: 1006.1918 (Jun. 9, 2010): 35-47. (Year: 2010).*

Sibi et al. "Analysis of different activation functions using back propagation neural networks." Journal of Theoretical and Applied Information Technology 47.3 (2013): 1264-1268. (Year: 2013).*

Mukkamala, Srinivas, Guadalupe Janoski, and Andrew Sung. "Intrusion detection using neural networks and support vector machines." Proceedings of the 2002 International Joint Conference on Neural Networks. IJCNN'02 (Cat. No. 02CH37290). vol. 2. IEEE, 2002: 1702-1707. (Year: 2002).*

International Search Report and Written Opinion in PCT/US2017/057363 dated Dec. 22, 2017. (15 pages).

Zhang Haipeng et al. "mFingerprint: Privacy-Preserving User Modeling with Multimodal Mobile Device Footprints" Apr. 1, 2014, Network and Parallel Computing; [Lecture Notes in Computer Science] Springer International Publishing,. Cham, pp. 195-203.

Raef Bassily et al. "Algorithmic stability for adaptive data analysis" Theory of Computing, ACM, 2 Penn Plaza, Suite 701, New York NY 10121-0701 USA, Jun. 19, 2016. pp. 1046-1059.

Adaptive Authentication for Enterprise, IAPRIORART00003020, 2009.

RSA Solution Brief, RSA Adaptive Authentication, Offering Multiple Ways to Provide Strong Two-Factor Authentication io End Users, IAPRIOR ART00003043, 2008.

RSA Solution Brief, RSA Adaptive Authentication, Balancing Risk, Cost and Convenience, IAPRIORART00003024, 2008.

RSA Adaptive Authentication for Financial Services, IAPRIORART00003036, 2008-2009.

RSA Adaptive Authentication, http://web.archive.org/web20100102005728 http://rsa.com/node.aspx?id=3018; IAPRIORART00003040, Jan. 2, 2010.

RSA SecurID Software Token 4.1 Administator's Guide, IAPRIORART00003047, Nov. 2009.

The RSA Authentication Decision Tree, IAPRIORART00003145, 2011.

Arcot RiskFort Fraud Detection, IAPRIORART00004119, Jan. 2, 2010.

Arcot RiskFort Fraud Detection, IAPRIORART00003337, Dec. 8, 2010.

Arcot RiskFort Fraud Dection and Prevention Data Sheet, IAPRIORART00003687, 2008.

Arcot RiskFort Administration Guide Version 2.2.6, IAPRIORART00003341, Sep. 2010.

Arcot RiskFort Installation and Deployment Guide (for Windows Platforms), IAPRIORART00003893, Sep. 2010.

Arcot RiskFort Installation and Deployment Guide (for Red Flat Enterprise Linux 4.0), IAPRIORART00003689, Mar. 2009.

Product Sheet: CA Arcot RiskFort, IAPRIORART00003331, 2010.

Data Sheet: CA Risk Authentication, IAPRIORART00003339, 2015.

How Unique is Your Web Browser, Peter Eckersley, Electronic Frontier Foundation, pde@eff.org, 2010.

Implicit Authentication Through Learning User Behavior, Elaine Shi, et al., 2010.

Implct Authentication for Mobile Devices, Markus Jakobsson et al., Aug. 2009.

* cited by examiner

SYSTEMS AND METHODS FOR RECOGNIZING A DEVICE AND/OR AN INSTANCE OF AN APP INVOKED ON A DEVICE

FIELD OF THE INVENTION

This disclosure generally relates to techniques for accurate and reliable identification of devices and/or instances of software applications executed on such devices and, in particular, to the determination by a computer whether a computing device and/or an app instance executed on a device that communicates with the computer has previously done so.

BACKGROUND

Service providers provide many different kinds of services to users via a communication network such as the Internet. Often, the users access these services using different devices and/or software applications installed on such devices. For example, a user may access a banking service via a laptop computer, a tablet computer, and a smart phone at different times and/or from different locations. Other examples include users watching movies or other content from an online content provider, and users accessing medical information, using different devices at different times and places. The user may use not only different devices but also different software applications, such as a browser provided by one vendor, another browser provided by a different vendor, a customized app provided by the service provider, etc. The user may use different apps on different devices and may even use different apps on the same device on different occasions.

In order to provide the services, service providers often register the user devices and/or apps they use. More than one device/app can be associated with a user. Such registration can allow a service provider to ensure that when a service request is received, only an authorized user is in fact accessing the service. The likelihood of unauthorized access to sensitive user information, such as banking records, credit card transactions, medical records, online shopping records, etc., can also be minimized if the service provider can recognize a requesting device/app as that associated with an authorized user.

To facilitate device recognition, some systems collect and transmit device/app data to a service provider's server during the initial registration process. Such data may include device and/or app characteristics such as a phone number, an identifier associated with circuitry of the device, an identifier associated with a carrier, a signature associated with a software component installed on the device, information about the operating system (OS) on the device, etc. The same device/app characteristics are generally collected and transmitted to the server again when the device/app is subsequently used to request a service. At the service provider's server, if the subsequently received data matches with the data stored at the server during the initial registration, the requesting device/app may be recognized as a returning device/app.

This technique encounters a number of problems, however. First, one or more device/app characteristics often change for legitimate reasons. For example, the OS may be upgraded and one or more other software components such as apps installed on the device may be removed or updated. Users may replace one carrier with another and, in some cases, may change a phone number associated with the device. Should any of the device/app characteristics that are used in device recognition change, the known techniques typically fail to recognize the device/app as a returning device. This may cause some inconvenience to the user. For example, the user may have to repeat the registration process.

Second, a malicious user (also called an adversary) can anonymize a device/app, causing the service provider's server to erroneously determine that a returning device is a new device, and use this error to the adversary's advantage. For example, an online content provider may run a promotion where the first visit to the content provider's service grants access to the content for free, while later visits would require a paid subscription. An adversary may change a particular device/app characteristic before each visit, so that the content provider's server fails to recognize that the device/app is actually a returning device/app and grants free access to the content to the adversary more than once.

Third, a malicious user (adversary) may spoof an authorized device/app by replacing the characteristics of an unauthorized device/app with those of the authorized device/app. As such, the service provider's server may erroneously determine that the requesting unauthorized device/app is the authorized device/app, and may grant access to service and/or data relating to the user of the authorized device/app to the adversary.

The table below illustrates a characteristic of failure rates. The diagonal from top left to bottom right illustrates correct behavior. The other diagonal illustrates erroneous behavior. The rate at which a new device/app (device/app which has not yet been observed) is erroneously associated with an identifier (ID) of a returning device/app is the False Accept Rate (FAR). The rate at which a returning device/app is erroneously not recognized as previously seen is the False Reject Rate (FRR).

|  | Identified with returning ID | Identified with new ID |
| --- | --- | --- |
| Returning Device | Correct | False reject rate |
| New Device | False accept rate | Correct |

The FAR and FRR may be attributed either to inadvertent issues in the identification solution, or portions of the FAR and FRR may be associated with malicious attacks. A spoof attack can contribute to the FAR because an adversary fools the system into believing that the requesting device/app is a returning one. An anonymization attack contributes to the FRR because the server fails to re-identify a returning device.

SUMMARY

In various embodiments, this disclosure describes a Third Generation fingerprint technology for accurate identification of a device (such as a smart phone, tablet computer, laptop, etc.) and/or an instance of a software application executed on a device, so as to minimize FAR and FRR. This is achieved at least in part by generating two kinds of attributes, namely, base fingerprint attributes and predictor attributes from data received from a device and/or an app instance (i.e., an instance of a software application invoked on the device). The base fingerprint attributes are used for selecting a group or a class of candidate devices/app instances. A particular device and/or an app instance may then be identified from the selected group/class using a predictor function derived from analysis of data previously collected from several devices/app instances. In general, the stability characteristics of the two kinds of attributes are different, and the predictor functions are particularly trained to determine whether a device/app instance is a previously unseen one or a returning device/app instance using, in substance, not the base fingerprint attributes but the predictor attributes, and the previously collected data. Various embodiments also feature the generation of predictor functions using machine learning/soft computing techniques.

In general, conventional fingerprint technology, i.e., technology used to distinguish between new and returning devices and/or app instances collects a lot of information from each device/app instance. However, such technology often discards much of the information due to poor stability. For example, a user may install new plugins or fonts onto a device. When an app is invoked thereafter, some of the collected information may change, even if it is the same user using the same device and the same app the user had used before. The fingerprint technology generally needs to have enough stability to tolerate such relatively modest changes. The existing state-of-the-art generally implements much of the tolerance for stability by discarding collected information that changes too frequently.

In contrast, the Third Generation technology described herein discards much less information. Entropy is an empirical measure of the amount of information, such as the information a device/app instance can divulge to an analyzing computer or server. Each time an app (such as a browser, a client app provided by a service provider) is invoked on a device, the device and/or the app generally divulges sufficient information for the purpose of identification of the device/app. However, since much of the information is unstable, improved techniques are needed for using at least some of the unstable information. Conventional techniques often use the stable information only or, if less stable information is used, no special consideration is typically given to the nature of the information, i.e., whether it is stable or unstable. In contrast, in various embodiments, the Third Generation techniques described herein perform a two stage analysis, first using the stable information to draw a partial inference and, then by refining the partial inference using the les stable information, by applying a machine learned classifier derived from less stable information, thereby resulting in a superior fingerprint.

The first generation of device authentication and business analytics tracking generally employed hypertext transfer protocol (HTTP) cookies. For example, in two-factor user authorization, a user supplied a password as a first factor, and used the cookie as a second factor. However, the first generation technology became less effective when users started to protect their privacy by frequently clearing their cookies. In the second generation, device authentication added the concept of a software application fingerprint. However, unlike a human fingerprint, an app fingerprint generally does not guarantee unique identification. If apps on different devices yield an identical fingerprint, we can say that the fingerprints conflict. As such, a goal of a candidate fingerprint-generation technique is to minimize the rate at which different apps conflict, i.e., to minimize the conflict rate. The conflict rate typically has an inverse relationship with the amount of information in the fingerprint (the entropy). As such, a fingerprint that relies upon a greater amount of information used for distinguishing between two or more devices/apps generally yields a lower conflict rate. The quantitative measure of information, as noted above, is the information entropy.

The second generation technology sometimes employed a concept called a fuzzy match which improved upon the ability to detect a returning device/app by relaxing the fingerprint comparison criteria. In particular, a fuzzy match may recognize that a returning fingerprint changes over time, so a fuzzy match can determine that two fingerprints that are not exactly identical may nevertheless be associated with the same device/app, if the two fingerprints are similar as defined by the parameters of the fuzzy match. A fuzzy match, however, generally increases the conflict rate. In general, the purpose of a fuzzy match is to improve longevity (which may be described as the length of time, usually measured in seconds, minutes, hours, days, weeks, months, etc., that a particular fingerprint tends to remain unchanged) while accepting a worsened conflict rate.

In various embodiments, the Third Generation technology uses machine learning to predict as to when an observation obtained from a device/app reflects a returning device, as opposed to a new or different device/app. The machine learning technology features an improved ability to perform the classification accurately by analyzing and learning from several (e.g., tens, hundreds, thousands, millions, or even more) observations collected from several (e.g., tens, hundreds, thousands, millions, or even more) devices and/or apps. The machine learned predictors are generally based on sufficient data and training, including less stable data, as described below. As such, the predictions are usually accurate and have a low conflict rate.

Accordingly, in one aspect, a method is provided for categorizing a device and/or a software application instance invoked on a device. The method includes the steps of: selecting by a server, from a database, a set of records corresponding to a base fingerprint where each record in the set of records includes a number of predictor attributes. The base fingerprint is based on software application instance data received form a device/app instance. The method also includes obtaining a predictor function, where the predictor function was derived via adaptive analysis of other software application instance data that may have been collected and analyzed previously. The method further includes, for each record in the set of records: computing by the server a set of difference values by comparing each one of a number of predictor attributes based on the software application instance data with a corresponding predictor attribute from a number of predictor attributes in the record, and determining a match indicator by applying the predictor function to the set of difference values. The obtained predictor function may be derived via adaptive analysis that is also iterative. Each one of the several predictor attributes based on the software application instance data may have a half life (described below) less than a selected threshold.

In some embodiments, the method further includes receiving at the server, the software application instance data from a device, where the software application instance data corresponds to an invocation of the software application on the device. The method may also include generating by the server from the software application instance data the several predictor attributes that are based on the software application instance data. The method may also include generating from the software application instance data a set of base-fingerprint attributes, and computing the base fingerprint using the set of base-fingerprint attributes.

In some embodiments, each one of the several predictor attributes based on the software application instance data has a half life less than a selected threshold, and each one of the set of base-fingerprint attributes using which a base fingerprint may be computed has a half life at least equal to the selected threshold.

In some embodiments, if each match indicator corresponding to the set of records indicates a failed match, the method includes designating a software application instance associated with the software application instance data as a new software application instance, and generating a new software application instance identifier and/or a final fingerprint. In this case, the method may also include adding to the database a new record that includes the new software application instance identifier and/or the new final fingerprint, a set of base-fingerprint attributes based on the software application instance data, and the several predictor attributes based on the software application instance data.

Otherwise, i.e., if one or more match indicators corresponding to the set of records indicates a successful match, the method may include selecting a first record for which the corresponding match indicator indicates a match, and designating a software application instance associated with the software application instance data as a returning software application instance that is associated with the first record. In this case, the method may also include replacing one or more predictor attributes in the first record with corresponding predictor attribute(s) based on the software application instance data.

The new software instance identifier and/or the final fingerprint may be computed using a pseudo-random number generator or a random number generator. The new software instance identifier and/or the final fingerprint may have at least 256 bits of entropy. In some instances, the new software instance identifier and/or the final fingerprint is mathematically unrelated to attributes derived from the software application instance data. The entropy of the new software instance identifier and/or the final fingerprint may exceed the entropy of all attributes derived from the software application instance data. The software application instance may include a browser instance or an instance of an app installed on a device.

In some embodiments, the method includes receiving at the server, the software application instance data from a device, and filtering the software application instance data to retain device-related data. In addition, the method may include generating by the server from the device-related data the several predictor attributes that are based on device-related data. If each match indicator corresponding to the set of records indicates a failed match, the method may include designating the device as a new device, and generating a new device identifier and/or a final fingerprint. In this case, the method may also include adding to the database a new record that includes the new device identifier and/or the final fingerprint, a set of base-fingerprint attributes based on the device-related data, and the several predictor attributes that are based on the device-related data. Otherwise, i.e., one or more match indicators corresponding to the set of records indicate a successful match, the method may include selecting a first record for which the corresponding match indicator indicates a match, and designating the device as a returning device that is associated with the first record.

In some embodiments, obtaining the predictor function includes generating based on at least in part the other software application instance data, a set of difference vectors and a target vector. Each difference vector may include one or more difference elements, where each difference element corresponds to a respective attribute of software application instances from the other software application instance data. Each difference vector may also corresponds to a respective element of the target vector (described below), and to a pair of software application instance observations and/or attributes based on such observations. The method may include applying a function to the set of difference vectors to obtain a prediction vector, and computing an aggregate error based on difference between the prediction vector and the target vector. In addition, the method may include modifying a function parameter to decrease the aggregate error, and designating the modified function as the predictor function.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to categorize a device and/or a software application instance invoked on a device. To this end, the instructions program the processing unit to: select from a database, a set of records corresponding to a base fingerprint where each record in the set of records includes a number of predictor attributes. The base fingerprint is based on software application instance data received form a device/app instance. The instructions also program the processing unit to obtain a predictor function, where the predictor function derived via adaptive analysis of other software application instance data that may have been collected and analyzed previously. In addition, the instructions program the processing unit, for each record in the set of records, to compute a set of difference values by comparing each one of a number of predictor attributes based on the software application instance data with a corresponding predictor attribute from a number of predictor attributes in the record, and to determine a match indicator by applying the predictor function to the set of difference values. In various embodiments, the instructions can program the processing unit to perform one or more of the method steps described above.

In another aspect, a method for providing a predictor function for categorizing a device and/or a software application instance includes the step of generating a set of difference vectors and a target vector. Each difference vector includes a number of difference elements, and each difference element corresponds to a respective attribute of software application instances. Each difference vector also corresponds to a respective element of the target vector, and to a pair of software application instance observations and/or attributes derived from such observations. The method also includes applying a function to the set of difference vectors to obtain a prediction vector, and computing an aggregate error based on difference between the prediction vector and the target vector. The method further includes modifying the function by modifying a function parameter to decrease the aggregate error, and designating the modified function as the predictor function.

In some embodiments, the function parameter includes a weight vector that includes a number of weight elements. Each weight element may correspond to a respective attribute of the software application instances. Modifying the function parameter may include selecting a value of at least one of the weight elements that minimizes the aggregate error. The function may include an activation function of an artificial neural network, and the activation function may be selected from the group consisting of a linear function, a sigmoid function, a hyperbolic tangent function, and an even step-wise function. In some embodiments, a support vector set may include the set of difference vectors, and the function may include a separator function. Modifying the function parameter to decrease the aggregate error may include maximizing a distance between the modified separator function and the support vector.

In some embodiments, a first group of attribute values is associated with a first software application instance, and a second group of corresponding attribute values is associated with a second software application instance. Generating the set of difference vectors and the target vector may include generating a difference vector by comparing, for each attribute in the first group of attribute values, a value from the first group with a value from the second group. The method may further include receiving a first group of observations associated with the first software application instance, and generating the first group of attribute values from at least one observation from the first group of observations. In addition, the method may include receiving a second group of observations associated with the second software application instance, and generating the second group of attribute values from at least one observation from the second group of observations. In some embodiments, each attribute in the first group of attribute values as a half life less than a selected threshold.

In some embodiments, the method further includes determining that the second software application instance and the first software application instance correspond to two invocations of the same software application, i.e., a single software application, by comparing respective values of an instance identifier associated with the first and second software application instances, and designating an element of the target vector corresponding to the difference vector as RETURNING. The instance identifier may include one or more of an activation index, a timestamp, and an identifier transmitted by a software application instance. In some embodiments, the instance identifier comprises a cookie associated with a software application instance.

In some embodiments, the method further includes determining that the second software application instance and the first software application instance are instances of different software applications and/or instances invoked on different devices by comparing respective values of an instance identifier associated with the first and second software application instances, and designating an element of the target vector corresponding to the difference vector as NEW. The instance identifier may include one or more of an activation index, a timestamp, and an identifier transmitted by a software application instance. In some embodiments, the instance identifier includes an operating system (OS) version associated with a software application instance, and the comparison of the respective values of the OS version is performed during a preset time window.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to provide a predictor function for categorizing a device and/or a software application instance. To this end, the instructions program the processing unit to: generate a set of difference vectors and a target vector. Each difference vector includes a number of difference elements, and each difference element corresponds to a respective attribute of software application instances. Each difference vector also corresponds to a respective element of the target vector, and to a pair of software application instance observations and/or attributes derived from such observations. The instructions also program the processing unit to apply a function to the set of difference vectors to obtain a prediction vector, and to compute an aggregate error based on difference between the prediction vector and the target vector. The instructions further program the processing unit to modify the function by modifying a function parameter to decrease the aggregate error, and to designate the modified function as the predictor function. In various embodiments, the instructions can program the processing unit to perform one or more of the method steps described above.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
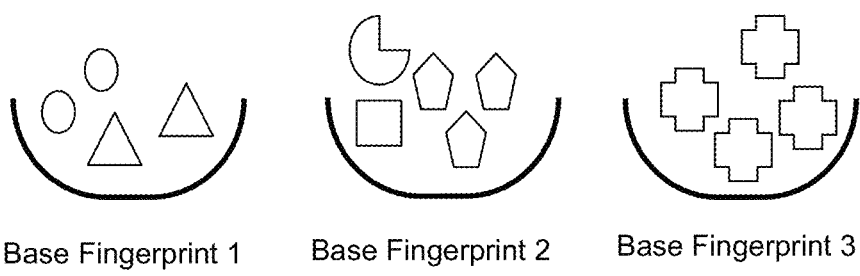
FIG. 1 schematically depicts bins corresponding to different base fingerprints, according to one embodiment.

As described above, cookies stored on a user device are sometimes used to determine whether a device/app instance is a new device/app instance or a returning one. A user can clear the stored cookies, however, and may cause an actual returning device/app instance to be erroneously determined to be a new device/app instance. Therefore, classification of a user device/app instance as a new one or a returning one using data/attributes based on app instances is gaining wide-spread acceptance. This is at least in part due to the fact that users typically cannot easily take an overt action, such as clearing cookies, with respect to the app instance data, so that such data that is used for classification would change or be removed.

Nevertheless, a user may take an action such as installing a new plugin, changing a physical location of the device or upgrading software. Changing the device location can cause the Internet Protocol (IP) address allocated to the device to change. The Internet Service Provider (ISP) and/or identity and other parameters of the ISP that are associated with the device/app may also change. These additions, changes, and/or upgrades can change the information collected from the device/app and, as such, the attributes derived from such collected information can also change. We call the length of time (measured in seconds, minutes, hours, days, weeks, months, etc.) that a particular attribute tends to remain unchanged or constant as the longevity of the attribute. We measure longevity in terms of its half-life, as described below.

Typically, the longevity and conflict rate have an inverse relationship. Suppose, for example, an engineer builds a candidate fingerprint by observing n attributes. Upon experimentation, the engineer discovers that two different devices/ apps yield identical attribute values for all n attributes, so their respective fingerprints are identical and, hence, conflicting. The engineer then identifies an n+1$^{th}$ candidate attribute which differentiates between the two devices/apps. Since the new attribute adds information which differentiates, the measurable entropy increases. However, the longevity of the fingerprint which depends upon the extra attribute may decrease because the n+1$^{th}$ attribute may be the first to suffer an inadvertent change.

The formula for Shannon entropy is provided below:

$$H(X) = -\sum_{i=1}^{m} P(x_i) \log_2 P(x_i)$$

where $P(x_i)$ is the probability of generating a fingerprint $x_i$ from the attributes derived from the collected observations, and m is the number of different fingerprints that are generated.

One measure of longevity is the half-life of an attribute which we measure in days in some embodiments. The half life can also be measured in seconds, minutes, hours, days, weeks, months, etc. Suppose we observe an attribute from n devices/app instances. Further suppose, that after d days, we statistically observe that n/2 devices yield a different value for the attribute, and at day d-1, fewer than n/2 devices yield a different value for the attribute. In this case, we say that the half-life of the attribute is d days.

The second generation technology typically uses a method which can be expressed as a closed-form function, e.g., Jaro-Winkler distance algorithm. In contrast, the Third Generation technology described herein uses machine learning. As a generalization, two types of machine learning exist: supervised and unsupervised. Supervised techniques tend to be more powerful, but they are only available when an effective method of data labeling exists. Unsupervised techniques may be used when no means of data labeling are conveniently available.

In statistical modeling, the dependent variables represent the output or outcome which is the subject of study. The independent variables represent the input or causes. In the case of categorical studies, the dependent variables are categories. For example, consider an individual's height and weight to be the independent variables; and the individual's gender to be the categorical dependent variable. Using predictive modeling, one may predict the gender based upon the height and weight. Perhaps, in order to improve the quality of the prediction, one may wish to improve by adding additional independent variables such as the length of the foot of the observed individual.

Various embodiments of the Third Generation fingerprint technology use supervised machine learning. In general, the technology divides an observation into stable attributes and unstable attributes as illustrated with reference to FIG. 1. The half-life of an attribute can be used to determine the relative stability of the attribute. As such, attributes having a half life greater than a certain threshold can be designated as stable attributes, and the other attributes can be designated as unstable attributes. In the example depicted in FIG. 1, three different base fingerprint values are computed using the values of the stable attributes (also called base fingerprint attributes) only. In general, a base fingerprint is a function of the values of one or more stable attributes. The function can be as simple as a concatenation of the strings representing the values of the stable attributes. It can be some other function, e.g., a hash function, of processed (e.g., concatenated) or unprocessed values of the stable attributes. For each base fingerprint, FIG. 1 depicts conflicts using shapes. For example, the app instances depicted by the circle and triangle are sufficiently similar to yield the same Base Fingerprint 1, yet are actually different app instances. Base Fingerprint 2 corresponds to three app instances which conflicted, and Base Fingerprint 3 has no conflicts.

Using supervised machine learning, the techniques described below can analyze one or more unstable attributes to understand how they behave. In other words, some of the independent variables, i.e., attributes generated form the collected device/app instance data, yield values that are more different when comparing a device/app instance represented by a circle with a device/app instance represented by a triangle than comparing two device/app instances that are both represented by circles, or that are both represented by triangles. The two app instances represented by circles are determined to be two different invocations of the same app on the same device. In contrast, two app instances represented by a circle and a triangle, respectively, are determined to be invocations of two different apps on the same device, or invocations of the same app on two different devices, or invocations of two different apps on two different devices.

Embodiments of the Third Generation technology generally do not employ machine learning to compare the less stable attributes across different base fingerprints. For example, some embodiments of the Third Generation technology do not compare the app instance represented by a circle, which is associated with Base Fingerprint 1, with the app instance represented by the pentagon, which is associated with Base Fingerprint 2. As discussed above, stable attributes are generally used in computing the base fingerprint and unstable attributes are typically used to analyze further whether a device/app having a particular base fingerprint is a new, previously unseen device/app, or is a returning device or another instance of the same app that was previously observed on the same device, and was associated with the same base fingerprint.

The second generation browser fingerprint technology often involves a trade-off between the conflict rate and the longevity. As an engineer tunes a second generation approach, improvements in longevity tend to degrade the conflict rate, and vice versa. In contrast, embodiments of the Third Generation technology described herein, allow the engineer to improve the conflict rate while imposing little or no impact upon longevity. "Improve" in this context means decreasing and not increasing the conflict rate. The result can be a superior fingerprint which has few conflicts and lasts a long time.

Base Fingerprint

As a general rule, the ideal base fingerprint should be based on a small total number of attributes. If a candidate base-fingerprint computation algorithm uses relatively few attributes, then any attribute that happens to be in the excluded set, i.e., an attribute not used in computing the base fingerprint, does not adversely impact the longevity of the base fingerprint. An optimized base fingerprint would ideally be based on a collection of independent attributes where each attribute contributes to the aggregate entropy without correlation. For example, suppose one could identify six independent attributes which all contribute three bits of entropy to a total entropy of 18, then one would require only six attributes in the computation of the base fingerprint, and all other attributes may be redundant. However, various attributes generated from the data obtained from a device/app instance tend to be far from independent. Rather, the confounding influence between respective attributes may be very high. While it may be true that some attributes contribute more than three bits of entropy, a base fingerprint typically requires more than six attributes to collectively achieve a high entropy. So, the goal is to pull together a larger collection of attributes that achieve an entropy objective without relying upon any attributes that exhibit poor longevity.

The theoretical maximal is the entropy taken over the full data set. Let A be the complete set of attributes derived from the obtained device/app instance data. The measure of entropy taken over all of the values in A is H(A). While H(A) may be the ideal, we typically cannot achieve a base fingerprint that yields H(A) without sacrificing too much of the longevity objective because many of the observed attributes exhibit a poor half-life. So, we define a relatively small constant, ε, that allows us to seek candidate base fingerprints which do not necessarily have an ideal low conflict rate, but where the conflict rate(s) of the candidate base fingerprint(s) is/are reasonably close, e.g., no more than 1%, 2%, 5%, 10%, 20% etc. of the ideal lowest conflict rate obtained when all A attributes are used in the computation of the base fingerprint.

First we identify candidate subsets of attributes where each subset has an entropy of at least (H(A)−ε). Next, we select only those subsets that include only attributes having an acceptable half-life. In some embodiments, all attributes having unacceptable half-life are excluded. Attribute subsets may then be formed from the remaining attributes such that one or more of the subsets have an entropy greater than equal to (H(A)−ε). We use the term recipe to denote the collection of attributes used in the computation of a base fingerprint. In various embodiments, ε can be 2-5 bits, or can be more, e.g., 7, 8, 19 or even more bits. One may measure the half-life of the attributes by monitoring the devices operated by users who rarely clear their cookies. For this limited subset of users, we can measure the date at which each attribute changes its value and then statistically estimate the half-life.

After we identify the attributes that can be used to generate the base fingerprint, the fingerprint can be computed in some embodiments using a message digest function, e.g., SHA-256. In other words, we first identify a collection of attributes $\overline{A} \subset A$, where $H(\overline{A}) \geq H(A)-\varepsilon$, and all of the attributes in $\overline{A}$ have an acceptable half-life. Next, in some embodiments we define the base fingerprint as SHA256($\overline{A}$). Suppose, for example, $\overline{A}$ includes two attributes (also called recipe attributes), where the first observation has the values <104,"banana"> corresponding to the two recipe attributes, and the second observation has the values <92,pear> corresponding to those two recipe attributes. Then, the base fingerprints corresponding to these two observations are: SHA256(<104,"banana">) and SHA256(<92,"pear">), respectively. One may estimate longevity of each attribute by statistically computing the observed half-life, as described above.

Final Fingerprint Computation

After building a base fingerprint, the next objective is to improve (i.e., decrease) the conflict rate by further increasing the entropy. To this end, a large collection of device/app instance data are analyzed. Specifically, to each attribute tuple in a set of attribute tuples, where the attributes are derived from observed device/app instance data, and where each attribute tuple in the set yields the same base fingerprint, we apply a predictor function. The predictor function is constructed to identify attribute tuples that may be based on observations obtained from different devices and/or apps, and to identify attribute tuples that may be based on observations obtained from the same device and/or the same app invoked at different times on the same device. Since all of the attribute tuples considered in this analysis have the same base-fingerprint, by definition, all of the base-fingerprint attributes (i.e., recipe attributes) must have identical values. In some cases, this condition is relaxed, i.e., instead or requiring identical base fingerprints, it is required that no more than 1, 2, 4, etc., recipe attributes have different values.

In general, the set of attributes used for computing the base-fingerprint must not intersect the set of attributes used by the predictor function. Thus, in general, the attributes of the device/app instance can be classified as:

Base-fingerprint attributes: In order to enhance longevity, the base fingerprint's domain does not cover all of the collected attributes.

Predictor attributes: The predictor covers attributes which are outside of the domain of the base fingerprint. From all of the attributes that are remaining after the base-fingerprint attributes (i.e., the recipe attributes) excluded, the best attributes to be used by a predictor function can be selected using dimension reduction techniques.

Unused attributes: The attributes which are neither used as the base-fingerprint attributes nor used as the predictor attributes, if any, may be discarded. The unused attributes may represent wasted entropy, in some embodiments.

Typically, the half lives of base fingerprint attributes are greater than the half lives of the predictor attributes, which are usually greater than the half lives of the unused attributes.

In some embodiments, a server records a comprehensive history of transactions (collection of information extracted from the device/app instances) in a database, although the server may delete old transactions when the database becomes too large. Each time the server receives an imprint of a device/app, the server computes and/or records all of the attributes used for the base-fingerprint computation and/or by the predictor function as illustrated in the example Table shown in the table below.

| Base fingerprint | Fingerprint | base-fingerprint attributes | | predictor attributes | | Not-Used (optional) |
|---|---|---|---|---|---|---|
| 19438 | acax | 27 | 8.1 | alpha | 42 | |
| 29145 | bwqa | 671 | 4.5 | gamma | 193 | |
| 19438 | acax | 27 | 8.1 | alpha | 42 | |
| 19438 | dkaw | 27 | 8.1 | beta | 42 | |
| 29145 | bwqa | 671 | 4.5 | gamma | 193 | |
| 45901 | phmz | 27 | 8.0 | delta | 45 | |

The example database table includes three different base fingerprints 19438, 29145, and 45901 (for the convenience of discussion only, the example shortens the size of a base-fingerprint to just five digits. In general, the size can be less than or greater than five digits). The system computed each base fingerprint using a deterministic algorithm (e.g., message digest or encrypted message digest) computed over the base-fingerprint attributes. Since the algorithm is deterministic, the values of all of the base-fingerprint attributes are identical if they compute the same base-fingerprint. For example, for base fingerprint 19438, the values of the base-fingerprint attributes are all <27,8.1>. If the values of even a single base-fingerprint attribute differ, the base fingerprint may also differ, as is the case of the base fingerprints 45901 and 19438.

Within a collection of identical base-fingerprints, the predictor attributes may potentially differ. For example, for base-fingerprint 19438, two entries have the predictor attributes <alpha,42>, and one entry has predictor attributes <beta,42>. One may guess that the two identical attribute tuples <27,8.1,alpha,42> were collected from exactly the same device/app at two points in time. However, the tuple <27,8.1,beta,42> may have been observed from a different device/app that happened to have a conflicting base fingerprint. In some cases, the attribute tuple <27,8.1,beta,42> may be derived from observations obtained from the same device but from the invocation of an app (e.g., App Y), which is different from another app (e.g., App X), invocation of which produced the attribute tuple <27,8.1,alpha,42>.

The column labelled "fingerprint" (also called the final fingerprint and/or a device or software app identifier) is the result of a combined procedure that leverages both the base-fingerprint computation and the predictor function. Suppose, for example, the server receives a new attribute tuple: <27,8.1,beta,520>, or receives a new set of observations using which the server computes the attribute tuple: <27,8.1,beta,520>. In various embodiments, the server first obtains or computes the base fingerprint over the recipe attributes <27,8.1>. This computation would produce the base-fingerprint 19438. Next, from the database all of the existing, non-redundant predictor attributes associated with the common base-fingerprint 19438 are accessed. These predictor attributes are the tuples <alpha,42> and <beta,42>. In some embodiments, only a subset of the existing, non-redundant predictor attributes are accessed. For example, if there are a total of 100 rows of non-redundant predictor attributes associated with a particular base fingerprint, a randomly selected sample of X % of those attributes, or the X % most recently generated attributes may be selected. The percentage X can be any number such as 90%, 80%, 75%, 60%, 50%, 40%, 25%, etc.

The predictor attribute tuple associated with the newly generated attribute tuple is <beta,520>. The predictor function is Boolean, i.e., it produces a binary result where, in some embodiments, a One indicates a prediction of a different device/app; and a Zero indicates a prediction of the same device/app. The predictor function is applied to each predictor attribute tuple accessed from the database and paired with the newly computed/obtained predictor attribute tuple. In some embodiments, if any of the prediction results are Zero, the procedure assigns the same fingerprint as the matched row, as described below. Otherwise, the algorithm pseudo-randomly or randomly generates a new fingerprint value.

Suppose, for example, the predictor function yields the value "1" for both pairs {<alpha,42>; <beta,520>" and {<beta,42>; <beta,520>}, in some embodiments. In this case, the procedure randomly generates a new fingerprint value. For example, the procedure may add the following new row to the database which adds a new fingerprint value, abac, to the table:

| 19438 | abac | 27 | 8.1 | Beta | 520 |
|---|---|---|---|---|---|

On the other hand, if the predictor function were to yield a Zero result for the pair {<beta,42>, <beta,520>}, in some embodiments, the procedure would modify the row {19438 dkaw 27 8.1 beta 42} by replacing the predictor attribute tuple <beta,42> with the newly obtained/computed predictor attribute tuple <beta,520> as shown below:

| 19438 | dkaw | 27 | 8.1 | Beta | 520 |
|---|---|---|---|---|---|

In this example, since the base fingerprint for the new attribute tuple (19438) matches with a base fingerprint associated with an existing row in the table, and, additionally, the predictor function result is also a match, the fingerprint (i.e., the final fingerprint) is determined to be the same as the fingerprint of the matched row, i.e., fingerprint dkaw. In some cases, the row/tuple {19438 dkaw 27 8.1 beta 42} is not modified but, because the predictor function result was a match, the newly obtained/computed attribute tuple is considered to be associated with a returning device/app corresponding to the fingerprint "dkaw." That tuple may be added to the database, resulting in two different entries (e.g., rows), each of which has "dkaw" as the base fingerprint.

Figure 2:
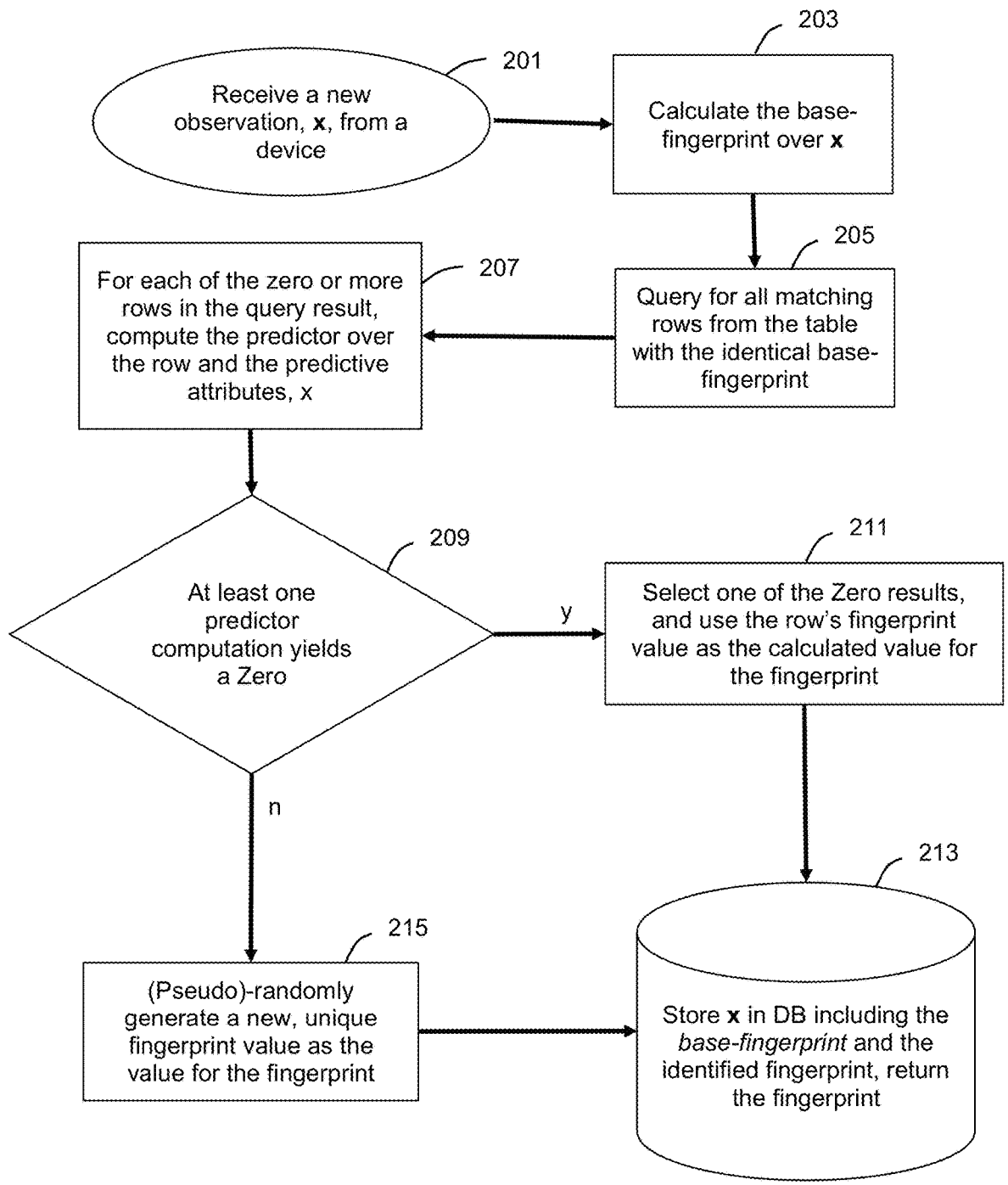
FIG. 2 illustrates a process of determining a final fingerprint using recipe attributes, predictor attributes, and a learned predictor function, according to some embodiments.

With reference to FIG. 2, a new observation is obtained from a device/app and a tuple of attributes "x" is computed by a server at step 201. In some embodiments, the observations are received and the tuple of attributes "x: is computed by a different processor, and is received by the server at step 201. At step 203, the base fingerprint is computed using the recipe attributes included in the tuple "x." All rows from a database table that have the matching base fingerprint are queried in step 205. Each matching row includes a respective attribute tuple, which includes a respective recipe attribute tuple and a respective predictor attribute tuple. For each row, the respective predictor attribute tuple is paired with the predictor attribute tuple within the newly computed/received attribute tuple (i.e., the attribute tuple computed/received at step 201). At step 207, a predictor function is applied to each row.

At step 209, all rows for which the predictor function yields a "Zero" result, as discussed below, are identified. One of these rows (e.g., the first row, the last row, the row where the underlying probability computation supporting the "Zero" result is the strongest, the most recently added row, a randomly selected row, etc.) is selected at step 211. In some embodiments, the application of the predictor function in step 209 is terminated as soon as a row yields the "Zero" result. As such, that particular row is selected in step 211. In addition, at step 211, the fingerprint (i.e., the final fingerprint) associated with the selected row is designated as the fingerprint (i.e., the final fingerprint) associated with the tuple "x" and the observations using which the tuple "x" was generated. At step 213, the attribute tuple "x," the associated base fingerprint, and the final fingerprint are stored in the database. The final fingerprint is provided in step 213 to another server, such as a service provider's computer, for user thereby, e.g., for user authentication.

If no row having a matching base fingerprint is identified at step 207, or if the predictor function did not yield a Zero result for any row in step 209, a new final fingerprint is generated randomly or pseudo-randomly, at step 215. At step 213, that newly generated final fingerprint is designated as the fingerprint (i.e., the final fingerprint) associated with the tuple "x" and the observations using which the tuple "x" was generated. At step 213, the attribute tuple "x," the associated base fingerprint, and the final fingerprint (which can be the newly generated final fingerprint) are stored in the database, and the final fingerprint is provided in step 213 to another server, such as a service provider's computer, for user thereby, e.g., for user authentication.

Predictor

In some embodiments, the predictor (which can be a device that includes custom circuitry, a programmed processor, or a combination of the two, or a process of performing the prediction functionality described herein) accepts two attribute tuples $x_1$ and $x_2$ generated from different observations and a predictor table, T, as input, and produces a Boolean result. In some embodiments, the predictor table T is a table of binary vectors (independent variables) and Boolean results (dependent variable), and the predictor accepts a binary difference vector D that represents whether the corresponding attribute values in the attribute tuples $x_1$ and $x_2$ are different or the same.

As such, the predictor can be described as:

$$\text{predictor}(x_1, x_2, T) \stackrel{def}{=} L(\text{diff}(x_1, x_2), T)$$

where, $$\text{diff}(x_{1,1 \ldots k}, x_{2,1 \ldots k}) \stackrel{def}{=} \langle d_1 \ldots d_k \rangle \mid d_{1 \le j \le k} = \begin{cases} 0 & \text{if } x_{1,j} = x_{2,j} \\ 1 & \text{otherwise} \end{cases}$$

and, $$L(\langle d_1 \ldots d_k \rangle, T) = T_{\langle d_1 \ldots d_k \rangle}$$

Suppose a predictor consults three attribute values. In the specification above for this example, k=3; and the predictor table has $2^3$=8 rows. For ease of explanation each binary vector $\langle d_1 \ldots d_k \rangle$ is converted into base10. For example, $\langle 0,1,1 \rangle$ converts into 3 and $\langle 1,1,0 \rangle$ converts into 6. After converting the binary values to base-10, an example predictor table, T, is shown below:

| Vector | Dependent Result |
|---|---|
| 0 | 0 |
| 1 | 1 |
| 2 | 0 |
| 3 | 1 |
| 4 | 0 |
| 5 | 1 |
| 6 | 0 |
| 7 | 1 |

Suppose the predictor operates over <alpha,8.1,43>, and <alpha,8.0,21>. First, a differences vector is computed as:

diff(<alpha,8.1,43>,<alpha,8.0,21>)=<0,1,1>

In this example, the respective values of the first predictor attribute are the same, i.e., alpha=alpha, yielding a difference value of 0. The respective values of the second predictor attribute are different, 8.1≠8.0, yielding a difference value of 1. The respective values of the third predictor attribute are also different, 43≠21, yielding another difference value of 1. As such, the difference vector is <0,1,1>. The difference vector <0,1,1> is converted into base-10 to yield 3, and the table T yields a result "1" for the decimal value 3 (i.e., the difference vector <0,1,1>. The interpretation is that the two predictor attribute tuples <alpha,8.1,43> and <alpha,8.0,21> are derived from observations received from two different devices/apps.

As a second example, predictor(<alpha,8.1,21>,<beta,8.0, 21>) yields 0. That is, diff(<alpha,8.1,21>,<beta,8.0,21>) yields <1,1,0>, and converting the difference vector <1,1,0> to base-10 yields 6. The $6^{th}$ index in the table T has the result value 0. The interpretation is that despite the fact that two predictor attributes differ in their respective values, the two predictor attribute tuples <alpha,8.1,21> and <beta,8.0,21> are derived from observations received from the same device/instances of the same app.

The predictor is a data-driven function whose quality depends upon the table T. We typically produce T using a supervised machine learning algorithm over labeled data. The labeling technique mines a vast collection of observations searching for specific, but unlikely coincidences. When a user upgrades an operating system of a device, the user normally schedules the upgrade during a quiet period where the device is usually idle for all purposes other than the upgrade. The upgrade usually takes a few minutes, and then reboots. So, one would generally not expect to observe a single device with two different operating system version numbers received in rapid succession. If such an observation is made, a more likely explanation is that one has observed two different devices/apps. Suppose these two devices/apps happen to share a common base-fingerprint. Then, we can conclude that the dependent value representing the two different devices/apps is a One (1).

In some embodiments, we build a table we call the "Ones" table as follows. We define observations in rapid succession, such as observations received within eight minutes. Within each set of observations that yield an identical base-fingerprint, search for differences in the observed operating system version within the eight minute threshold. The domain of the search is typically large, requiring several minutes or hours of computation in order to mine a sufficient number of coincidental observations. We call the collection of these coincidental observations the "Ones" table because One is the value designated to the dependent variable when the value of a particular attribute, such as the OS version, is observed to have changed in a small time window, e.g., eight minutes. This is based on the assumption that a likely explanation for the change in the observed data/attribute is that two different devices happened to share a base-fingerprint, as opposed to one device rapidly changing its operating system version within just eight minutes and then re-accessing/executing the application.

It should be understood that a window of eight minutes is illustrative only of a short time period and that other values (e.g., 2 seconds, 30 seconds, 1 min, 5 min, 15 min, 40 min, 2 hrs, 6 hrs, 1.5 days, 4 days, etc.) can be used to define a short window. Similarly, the OS Version is only one example of an attribute that is not likely to change in a small time window. Other attributes and/or combinations of attributes, such as ISP domain address when the device location has not changed, are also not likely to change in a small time window, and can be used in building the "Ones" table. Instead of using an attribute such as the OS Version, ISP address, etc., or in addition to such attribute(s), an app instance identifier may be included in the observations received from a device/app that can be used to determine whether two or more instances of an app are associated with the same app invoked at different times on the same device. Such app instance identifiers may include an activation index, a timestamp, an identifier transmitted by a software application instance, a cookie associated with a software application instance, and/or a combination of two or more of such app instance identifiers.

A "Zeros" table representing observations that differ in some attributes but are taken from the same device/app is also built. Some users rarely, if ever, clear their cookies. As such, in some cases we mine the data to build the Zeros table by restricting the search to only include devices which retain cookies for long periods. In some embodiments, we defined "long" as extending beyond 60 days. Here again, the number 60 is only one example. Long period may include shorter or longer durations (e.g., a few seconds, a few minutes, a few hours, less than 60 days such as 1, 3, 10, etc., days, and more than 60 days, e.g., 90, 100, 120, 140, 180, 300, or more days). If observe an identical cookie value at both an initial day, and at or beyond the long period, we conclude in some embodiments that the same device/app was observed twice. If any of the predictor attributes computed from the observed data are different, we populate the Zeros table with such predictor attribute values.

The "Ones" table and the "Zeros" table may share exactly the same attributes. The reason for the large, multi-hour mining exercises is to build tables of sufficient sizes so as to perform a data analysis exercise for data classification. The objective is to build a predictive function that consumes the attribute values and predicts whether the dependent result may be a One or a Zero. In some embodiments, we used logistic regression to build a predictor function. After cross validating, our test correctly predicted at a rate of 90%±5%. In other embodiments, we used: Regression Trees, Random Forests, Neural Networks, and Support Vector Machines to build predictor functions to perform the classification, i.e., the task of designating a device/app as a new or returning, as described below.

Classification Techniques

Different embodiments of classification techniques used for computing Third Generation Browser Fingerprints are now described.

Statistical Classification is described as the problem of identifying the class of a new observation on the basis of a training set of previously obtained and analyzed observations whose class membership is known. In various embodiments, the two classes are defined as "Returning Devices/Apps" and "New Devices/Apps." For convenience of discussion only, we relabel these classes as class "0" and class "1," respectively. In some embodiments, in order to provide training data to be used in the generation of a predictor function, we separate the two classes based on the following criteria:

"0" class—devices/app instances which appeared on a given day and 60 days prior to that day, are designated as returning devices. In some embodiments, we used the "browser.cookie" attribute to make sure the two observations corresponded to the same device or app, but other attributes can be used, as well.

"1" class—devices/apps observations yielding different "OS version" attribute values within 8 minutes. This criterion was used to distinguish two different devices/apps from each other, that otherwise appeared to be similar.

Supervised Learning

In the context of Machine Learning, the classification problem defined above is considered an instance of supervised learning. A supervised learning algorithm analyzes the training data and produces an inferred function, which can be used for mapping new observations. An optimal scenario will allow for the algorithm to correctly determine the class labels for any received observation. It is important to note that the class variable, which may be designated as "0" or "1" is defined as the "target" variable in the training set. In various embodiments, the "target" variable is dichotomous, and therefore, we focused on supervised learning techniques which specializes in binary classification.

In various embodiments, in order to solve a supervised learning problem, one or more of the following steps are performed. Data received from devices/apps are preprocessed to generate the independent variables of the training data set. The preprocessing may include converting raw observations into features or attributes. An example of pre-processing is to transform an IP address of the form A.B.C.D into a netmask/24 address value of A.B.C. This transformation may be useful, for example, in eliminated noise attributed to subnets. The preprocessing may optionally include feature selection, as described below, as well. In various embodiments, we defined our independent variables as binary "difference vectors" showing differences between values of corresponding attributes of the observed data.

In one example, three attributes <A1, A2, A3> are obtained from the data received from a device/app, also called observations. Suppose the attribute tuple associated with the first observation is <1,2,3>, and the attribute tuple associated with a second observation is <1,2,4>. In this case the difference vector is <0,0,1>, because the value of only the third attribute is different. In some embodiments, the difference vectors are binary, i.e., if the values of an attribute are identical or within a specified tolerance of an attribute value (e.g., within 0.01%, 0.2%, 1%, 5%, 10%, etc. of an attribute value), the corresponding difference is designated "0" and, otherwise, the corresponding difference is designated "1." In some embodiments, values of the elements of a difference vector are real numbers. In order to avoid attributes having values in greater numeric ranges dominating those having values in smaller numeric ranges, the values of one or more attributes may be scaled. In some cases, the values of the elements of a difference vector are quantized to a pre-selected number of levels, e.g., 3, 5, 10, etc. levels.

Thereafter, a training set and a testing set are generated. In one case, we obtained a full data set of 40,000 observations with approximately 20,000 observations for each class, i.e., classes "0" and "1" discussed above. In other words, of the total 40,000 observations, approximately 20,000 observations (with a variation of 1%, 2%, 5%, 10%, 20%, etc.) were associated with returning devices or app instances, and approximately 20,000 observations (with a variation of 1%, 2%, 5%, 10%, 20%, etc.) were associated with new devices or app instances. In some embodiments, this dataset was divided into a training set and a test set in the 60:40 ratio, respectively. Other ratios, such as 50:50; 75:25; 80:20, are also possible in different embodiments. If the observed data is not class-balanced, i.e., the number of observations in each of the classes "0" and "1" are not approximately equal, calibrations to class-balance the data may be performed. Different techniques of calibrating the data can be employed. In some embodiments, elements of the smaller class are randomly selected and duplicated until the size of the classes balance. For example, suppose there are 40,000 Zeros, and 60,000 Ones. Randomly, select 20,000 of the Zeros and duplicate each one. This can provide a class balanced training set of 60,000 Ones and 60,000 Zeros. Another technique is to randomly select 20,000 of the Ones and remove them so as to produce a training set of 40,000 Ones and 40,000 Zeros.

In some embodiments, feature selection is optionally performed, i.e., a set of significant attributes may be selected to be used by the predictor function to be learned. Although, many attributes can be generated from the raw observations in the training dataset, a set of significant attributes (also called significant input attributes) may be selected as inputs of the predictor function to avoid problems associated with excess dimensionality and over-fitting. In some embodiments, feature selection was performed by choosing those attributes that showed the largest variation of the attribute values between the two classes. For example, if an attribute "X" has a value "p" for most of the observations belonging to class "0," and the same attribute "X" has a different value "q" for most the observations belonging to the other class "1," we select that attribute as a significant input attribute. As such, the significant input attributes allow us to infer that if the difference element corresponding to a significant input attribute (e.g., the attribute "X") is "1," then the classification is more likely to be class "1." Conversely, if the difference element for a significant input attribute is 0, then the classification is more likely to be class "0." In some embodiments, the significance of an attribute may be related to the half life thereof. For example, an insignificant attribute may have an insufficiently short half-life, while a significant attribute may have a sufficiently long half-life. In this context, sufficiently long means at least equal to a threshold other than one used to distinguish base-fingerprint attributes from predictor attributes.

Various embodiments also include determining the structure of the predictor function. Since the classification problem to be solved is a dichotomous problem, Logistic Regression based classification and/or Support Vector Machines (SVM) based classification can be employed. In some embodiments, an Artificial Neural Network (ANN) can also be used. Depending on the kind of machine learning technique used, a structure of the predictor function is selected as discussed below. The predictor function typically includes several parameters that are adjusted using a training set and may be validated using the test set. The accuracy of the predictor function in accurately classifying a set of observations can also be determined using the test set.

Logistic Regression

In some embodiments, Logistic Regression is used to derive the predictor function. As described above, the "target" variable in our classification problem is categorical (class "1" or class "0"). We define our binary "target" variable as Y, and model the conditional probability $Pr(Y=1|X \Rightarrow x)$ as a function of x. The tuple X is the input feature tuple (also called input attribute tuple), where the attributes (i.e., attribute values) in the tuple are generated from the data observed and/or received from a device and/or an app instance. The input attributes can be significant attributes as discussed above. In various embodiments, X includes only the predictor attributes and not the base-fingerprint attributes. The vector x is the corresponding difference vector, obtained by comparing, element-by-element, the attributes (i.e., the attribute values) in the tuple X with another tuple $X_1$ that is generated from previously observed/collected data.

Let the set of all available attributes that can be generated from the observed data be $A \triangleq \{A_1, A_2, \ldots, A_N\}$. Let X be a subset of A, where the cardinality of X is K≤N. Thus, X can be written as $X \triangleq [X_1, X_2, \ldots, X_K]$. As discussed above, X may include only the significant attributes, and typically includes only the predictor attributes. Let $O_R$ be an observation received from a device and/or an instance of an app invoked on a device. From this observation, all N attributes may be generated, but only K of these attributes, as defined by X, may be selected. Let $O_1$ be a previously obtained observation. We can select the same X attributes from $O_1$ and compute a difference vector. Specifically, we compare the value of attribute $X_1$ of $O_R$ with the value of the same attribute from $O_1$, and so on, for each of the K attributes. In various embodiments, this gives us the binary difference vector $x \triangleq [d_1, d_2, \ldots d_K]$, where each $d_j$, 1≤j≤K, is either "0" or "1." Let $p(x)=Pr(Y=1|X=x)$. Thus, $p(x)$ is the probability that the target variable is designated "1," if a difference vector generated from the attributes X generated from the observed data is x, i.e., the class of the device/app instance that produced the observed data is designated as new, and is not identified as returning.

In some cases, p(x) can be a linear function of x. But p(x), a probability, is bounded between 0 and 1, and linear functions are unbounded. Additionally, we have discovered that changing p requires a bigger change in x when p is already large (or small) than when p is close to 0.5. This is analogous to the property of diminishing returns where the probability function p(x) is shaped like "S." Although p(x) may not be linear, log p(x) is a linear function of x. Logistic regression utilizes this property and defines the modified log function "logit" as $$\log \frac{p}{1-p},$$

which is both a linear function of x and follows the properties of a probability function.

Therefore, in various embodiments we use the following logistic regression model:

$$\text{logit}(p) = \log\left(\frac{Pr(Y=1|X=x)}{Pr(Y=0|X=x)}\right) = \log\frac{p(x)}{1-p(x)} = \beta_0 + x\beta_1 \quad (1)$$

Solving for p we have:

$$p(x) = \frac{e^{(\beta_0 + x\beta_1)}}{1 + e^{(\beta_0 + x\beta_1)}} = \frac{1}{1 + e^{-(\beta_0 + x\beta_1)}} \quad (2)$$

It is important to note that the coefficients in Equation (1) can be interpreted in terms of the log odds, where $\beta_1$ implies that a unit change in the independent variable x (which can be a difference element in various embodiments) will result in a $\beta_1$ unit change in the log of the odds. Likewise, if there are several independent variables $(x_1, \ldots, x_n)$, each of which is an element of a difference vector and corresponds to a respective predictor attribute, there can be $(\beta_1, \ldots, \beta_n)$ coefficients that determine the log of odds.

Equation (1) illustrates the logit function follows a linear regression model with an intercept of $\beta_0$ and a slope of $\beta_1$. Changing the parameter $\beta_1$ can change the direction and/or the steepness of the S-curved function. Changing the parameter $\beta_0$ shifts the sigmoid function along the X axis. In other words, in various embodiments, logistic regression provides a linear classifier with $\beta_0 + x\beta_1 = 0$ being the decision boundary, which separates the two target classes "0" and "1" described above. This decision boundary is a point if x (the difference vector) is one dimensional, a line if x is two dimensional, and is multi-dimensional, in general.

For the Third generation device/app fingerprints, in some embodiments we selected nine significant input attributes and, hence, our logistic regression model can be described as:

$$p(x) = \frac{e^{(\beta_0 + x_1\beta_1 + \ldots + x_9\beta_9)}}{1 + e^{(\beta_0 + x_1\beta_1 + \ldots + x_9\beta_9)}} \quad (3)$$

The supervised machine learning process analyzes the observed and collected data to identify the optimized values for the parameters $\beta_0, \beta_1, \ldots, \beta_9$. The optimized parameter values minimizes the Root Mean Square Error (RMSE) of p(x) relative to the actual value of the target variable Y.

To minimize the mis-classification rate, in some embodiments we designated Y=1 when p≥0.5 and Y=0 when p<0.5. Then, if the device/app instance is known to be returning, the actual value of Y is 0; otherwise the actual value of Y is 1. The error between the actual value and the value generated by the predictor function is (Y−p(x)). In various embodiments, the parameters $\beta_0, \beta_1, \ldots, \beta_9$ are selected such that the RMSE across several (Y−p(x)) computed across several tuples of attributes in the training dataset is minimized. In some cases, the GLM function available in the R programming language can be used to obtain the optimized estimates for $\beta_0, \beta_1$, etc.

If an artificial neural network is used to derive a predictor function, p(x) can be an activation function of the artificial neural network. Such a p(x) can be a linear function, a sigmoid function, a hyperbolic tangent function, an even step-wise function, or a combination of two or more of such functions.

Support Vector Machines (SVM)

In some embodiments, we built a predictor function using SVM for our Third Generation device/app fingerprints. SVMs, in general, are based on linear classifiers, and a linear classifier is based on a linear discriminant function of the form:

$$f(x) = w^T x + b \quad (4)$$

The vector w is typically called the weight vector and b is called the bias. For the case where b=0, the set of points for which $w^T x = 0$ are all the points that are perpendicular to w and go through the origin, a line in two dimensions, a plane in three dimensions, and more generally, a hyper-plane. The bias b translates the hyper-plane away from the origin. The hyper-plane is defined as:

$$\{x: f(x) = w^T x + b = 0\} \quad (5)$$

The hyper-plane defined in Equation (5) divides the space into two partitions. The sign of the discriminant function f(x) denotes the side of the hyper-plane a point is on. This boundary that separates the positive and negative regions is called as the decision boundary of the classifier. If the decision boundary defined by the hyper-plane is linear in the input observations, it is said to be a linear classifier, and conversely, if the hyper-plane is non-linear in the input observations, it is said to be a non-linear classifier.

In various embodiments, we describe the SVM-based predictor function as follows: Given a training set of observation-target pairs $(x_i, y_i)$, i=1,...,l where $x_i \in \mathbb{R}^n$ and $y \in \{1, -1\}^l$, the support vector machine seeks a solution to the following optimization problem:

$$\min_{w,b,\xi} \frac{1}{2} w^T w + C \sum_{i=1}^{l} \xi_i$$

subject to:

$$y_i(w^T \phi(x_i) + b) \geq 1 - \xi_i,$$

$$\xi_i \geq 0$$

where w, C, φ, and $\xi_i$ are the weight vector, soft-margin constant, higher-dimensional transformation function, and the slack variable respectively. Usually in SVM, a greater margin of separation can be achieved by letting the classifier to misclassify some examples. To allow for such errors, the inequality $$y_i(w^T \phi(x_i) + b) \geq 1 - \xi_i; \quad i=1,\ldots,l$$

can be used where $\xi_i \geq 0$ are slack variables that allow an example to be in the margin ($0 \leq \xi_i \leq 1$) or to be misclassified ($\xi_i \geq 1$). Since an example is misclassified if the value of its slack variable $\xi_i$ is greater than 1, $\Sigma_{i=1}^{l} \xi_i$ is a bound on the number of misclassified examples. Therefore, this term is controlled by a constant C>0 in the overall optimization problem where C acts as a penalty parameter for the error term and sets the relative importance of maximizing the margin and minimizing the amount of slack.

In some embodiments, when the data is not linearly separable, the training vectors $x_i$ are mapped in to a higher dimensional space by a suitable function φ so that they can be linearly separable in a higher dimensional space. The training vectors can be generally described as $x_i \in \mathbb{R}^n$. In various embodiments the difference vectors computed as described above are used as the training vectors. As such, $x_i$ are the difference vectors, but are often referred to as feature vectors in the context of SVMs. In various embodiments, the SVM finds a linear separating hyper-plane with the maximal margin in this high dimensional space.

In some embodiments use a kernel function described as: $K(x_i, x_j) = \phi^T(x_i)\phi(x_j)$, where $x_i$ and $x_j$ are attribute vectors/tuples in a training data set, and may be related to two different observations. The kernel function can improve the computational power of various embodiments of the SVM algorithm, because the kernel function implicitly work in a higher-dimensional space, without explicitly building the higher-dimensional representation. The kernels used in various embodiments include: (a) linear: $K(x_i, x_j) = x_i^T x_j$; (b) polynomial: $K(x_i, x_j) = (\gamma x_i^T x_j + r)^d$, $\gamma > 0$; and (c) radial basis function (RBF): $K(x_i, x_j) = \exp(-\gamma \|x_i - x_j\|^2)$, $\gamma > 0$. Here, γ, r and d are kernel related hyper-parameters. In some embodiments of our Third Generation technique, we performed a cross-validation and grid-search in order to find the best hyper-parameters for the predictor function and found the optimal penalty, C, and value of γ as C=γ=0.1. In order to decrease the aggregate error between the results of the predictor function and the actual target values, one or more parameters may be selected so as to maximize a distance between a separator function and the support vector.

In some embodiments, we built the predictor function using one or more of the following classification techniques.

Decision Tree: We used rpart function in R to build a decision tree model based on the chosen significant input attributes. In order to avoid over-fitting, we used cross-validation where the complexity parameter associated with the smallest cross-validated error was used. We also used Classification and Regression Tree (CART), C4.5, and C5.0 implementations.

Random Forests: Random forests and bagging techniques can be used in order to find an ensemble predictor function which uses all the available predictor attributes.

Neural Networks: In some embodiments, Back-Propagation inspired Neural Networks were used in order to build a predictor function.

Naïve Bayes: In some cases we employed a Bayesian based approach, such as Naïve Bayes, in order to build our binary predictor function.

Cubist: A rule-based predictive model Cubist can be used to build a binary predictor function for the classification described above.

Exampled of Learning Predictor Functions

As discussed above, some embodiments for recognizing a device or an instance of a software app, such as a browser, on the device leverage machine learning. In these embodiments, the machine learning techniques derives a predictor function, also called a classifier function, based upon training data. The predictor function yields a logical 0 value (called 0, for convenience) when an observation is determined to be so similar to a previous observation that the two observations are probably from the same device or app; and the predictor function yields a logical 1 value (called 1, for convenience) otherwise.

In deriving the predictor function, the intuition is that if one can build a linear or non-linear predictor function that usually (e.g., at an error rate of no more than 0.1%, 0.5%, 1%, 2%, 10%, 15%, 20%, etc.) gets the right answer on the training data, then the predictor function will probably behave similarly when presented with data received in operation that has not been characterized yet as associated with a returning device/app or a new device/app. In other words, if the past data is a good approximation of future data, and if the predictor function can accurately classify the past data, then the predictor function will likely classify the uncharacterized future data accurately, e.g., at an error rate of no more than 0.1%, 0.5%, 1%, 2%, 10%, 15%, 20%, etc.

Consider the following example table listing attributes A1 through A5 that can be generated from the observed data. The observed data is obtained from devices and/or instances of apps invoked on the devices.

| A1 | A2 | A3  | A4 | A5      |
|----|----|-----|----|---------|
| 1  | A  | Ab1 | Zz | 12345   |
| 2  | A  | Ab1 | Zz | 8342834 |
| 3  | B  | Xy2 | Zz | 23723   |
| 3  | B  | Xy2 | Zz | 89392   |

In general, the set of all available attributes is denoted A, and the number of all available attributes is |A|. In the example above: A=<A1, A2, A3, A4, A5>, where A1, . . . A5 are individual attributes, and |A|=5. It should be understood that the total number of attributes, |A|=5, is illustrative only and that |A| can be less than or more than 5. For example, |A| can be 8, 10, 17, 30, or even more.

Using dimension reduction, an attribute set G E A is selected, where size(G)=K≤|A|. For example, G=<A1, A2, A3>, and K=3, where attributes A4 and A5 are not leveraged in generating the predictor function. Here again, it should be understood that the total number of selected attributes, K=3, is illustrative only and that K can be less than or more than 3. For example, K can be 2, 7, 12, 20, 25, or even more. Also, the selected attributes can be non-consecutive, e.g., <A1, A3, A4>, or <A2, A5>, etc. In some embodiments, "all" attributes in the set A include any and all attributes that can be derived from the observed data, including the base-fingerprint attributes and the predictor attributes. As discussed above, the base-fingerprint attributes are generally not used by the predictor function and, as such, the set G does not include the base-fingerprint attributes in various embodiments. In some embodiments, "all" attributes in the set A include only the predictor attributes and the set G is a subset of selected significant predictor attributes. In some cases, the dimension reduction step is omitted, which is equivalent to saying G=A, where A includes the predictor attributes only.

In some embodiments, we define the predictor function $f$ as $y=X\beta+\varepsilon$, where $y\in\mathbb{R}^n$ is the target vector, $X\in\mathbb{R}^{n\times K}$ is the predictor matrix, $\varepsilon\in\mathbb{R}^n$ is the error vector, and n is the number of observations. In various embodiments, the classifier $f$ is based on a difference vector $D^i$, i.e., $X^i=D^i$, where each difference value $d_k^i$ in $D^i$ corresponds to a respective attribute $g_k$ from G, for all k from 1 . . . , K, and where each difference value $d_k^i$ is associated with a respective weight $\beta_k$, where the vector of all K weights (parameters) is denoted by $\beta$. This $\beta$ vector is estimated by minimizing (or maximizing) a cost function such that the probability $P(y=1|x)$ is large when the training observation x belongs to class 1 and small when x belongs to class 0 (i.e. $P(y=0|x)$ is large). In different embodiments, this cost function can be represented in different forms, for example, maximum likelihood function, sum of square error, root mean squared error, matrix derivatives, etc. The purpose of optimizing this function is to estimate the $\beta$ parameter vector which provides an optimized decision boundary separating the classes. This can be achieved by minimizing the training error, i.e., the difference between the predicted and actual outcome using some or all of training observations.

To this end, in some embodiments, in creating a difference table, we pair observations and take the difference. To illustrate, we pair the first two rows of the table above, and pair the third and fourth row, as well. These pairings are illustrative only and various other pairings can be considered. Generally, we take into account the columns included in G=<A1, A2, A3> only. As such, we represent two difference vectors as:

$D^1$=<1,0,0> computed from: <1,A,ab1>−<2,A,ab1>
$D^2$=<0,0,0> computed from: <3,B,Xy2>−<3,B,Xy2>

Figure 3:
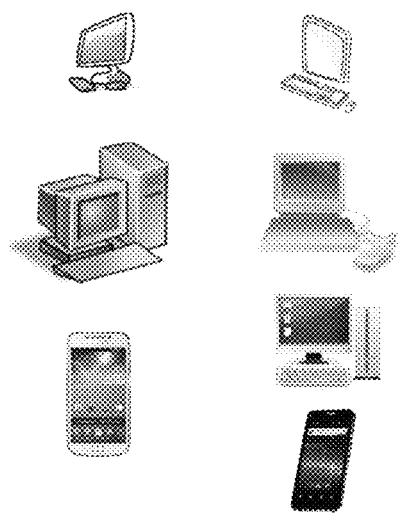
FIG. 3 depicts different devices/apps that can be used to generate training and testing data sets, according to various embodiments.
Figure 4:
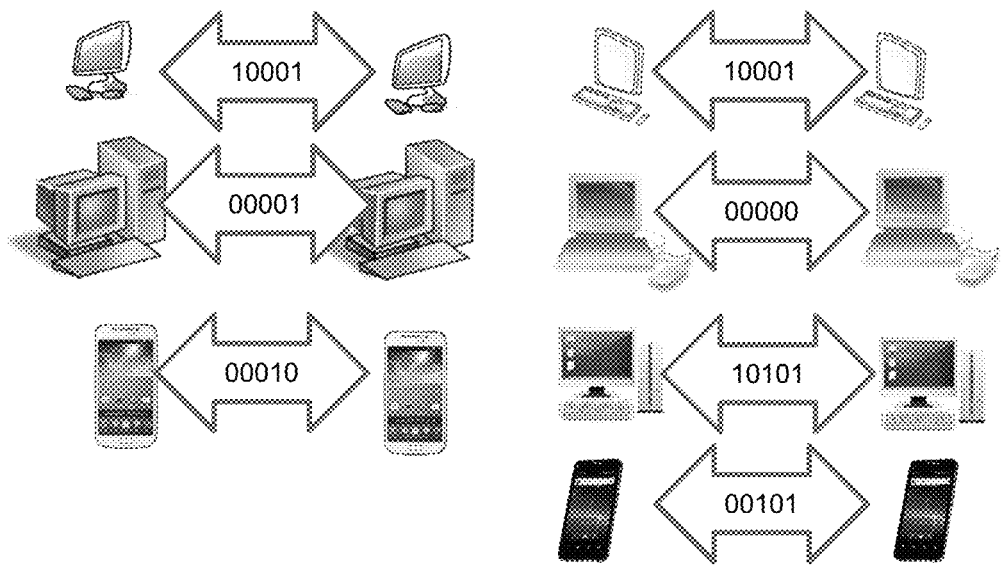
FIG. 4 schematically depicts the generation of a Zero matrix further used in deriving a predictor function, according to some embodiments.
Figure 5:
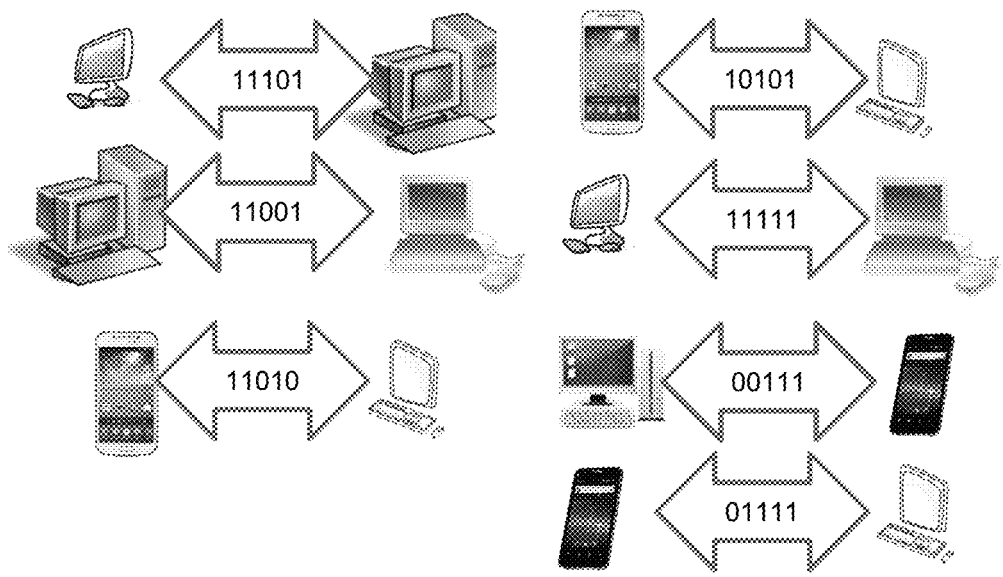
FIG. 5 schematically depicts the generation of a One matrix further used in deriving a predictor function, according to some embodiments.

More generally, in some embodiments, we first identify R different devices, e.g., R=7, as shown in FIG. 3. In general, R can be any number, such as 4; 10; 30; 100; 250; 1000; 6,000; 15,000; 50,000; 200,000; or more. We randomly select one of the R devices, and observe it twice. Each observation of a device may potentially differ and, over time, the differences may accumulate. In order to capture such differences, we time the observations so that they are minutes, hours, days, weeks or months apart. From these observations, we generate attributes and create the difference vector for the predictor attributes. As shown in FIGS. 4 and 5, this process is repeated until N/2 difference vectors are generated, where N is the size of the training set. In this example, N=14 but in general N can be any number such as 10; 50; 200; 750; 10,000; 250,000; 800,000; or more. A total of five (5) predictor attributes are used in this example, i.e., K=5. As discussed above, K can be any number.

Various techniques can be used to ensure that two or more observations, at least one of which is different from another observation, are obtained from the same, selected device. For example, the environment in which the data is collected while building the training set can be controlled such that the each of the R devices/app thereon transmits data within a designated time window, so that the collecting server would know which device/app is transmitting data at a particular time. In some cases, during data collection for training, the device/app can transmit its identity, which can be used to group together the different observations obtained from the same device/app. In some cases, the presence of a cookie over a specified time period (e.g., several hours, days, etc.) can be detected in the collected data to associate two or more observations with the same device/app.

The matrix of all the N/2 difference vectors, where the differences are computed from the attributes derived from observations obtained from the same device/app is called the Zero Matrix, and is denoted $D_Z$. Because it is known that the observations used in computing each difference vector were obtained from the same device/app, in the corresponding target vector, denoted $y_{az}$ (also referred to as dependent vector or vector of dependent variables), each of N/2 values is set to 0, as shown below.

$$D_Z = \begin{bmatrix} 1 & 0 & 0 & 0 & 1 \\ 0 & 0 & 0 & 0 & 1 \\ 0 & 0 & 0 & 1 & 0 \\ 1 & 0 & 0 & 0 & 1 \\ 0 & 0 & 0 & 0 & 0 \\ 1 & 0 & 1 & 0 & 1 \\ 0 & 0 & 1 & 0 & 1 \end{bmatrix}, y_{az} = \begin{bmatrix} 0 \\ 0 \\ 0 \\ 0 \\ 0 \\ 0 \\ 0 \end{bmatrix}$$

We also randomly select a pair of different devices from R, and collect at least one observation each from each the devices in the pair and/or apps executed on these devices. We generate attributes from the collected observations, and create difference vectors by comparing one or more of the predictor attributes. This process is repeated to obtain N/2 difference vectors, as depicted in FIG. 4. The techniques discussed above for determining whether two observations are obtained from the same device/app can also be used to ensure that two observations are obtained from two different devices/apps.

The matrix of all the N/2 difference vectors, where the differences are computed from the attributes derived from observations obtained from different devices/apps is called the One Matrix, and is denoted $D_W$. Because it is known that the observations used in computing each difference vector were obtained from different devices/apps, in the corresponding target vector, denoted $y_{aw}$, each of N/2 values is set to 1, as shown below. In some embodiments, $D_W$ is limited to observations known to arise from different devices, yet happen to share a common base-fingerprint.

$$D_W = \begin{bmatrix} 1 & 1 & 1 & 0 & 1 \\ 1 & 1 & 0 & 0 & 1 \\ 1 & 1 & 0 & 1 & 0 \\ 1 & 0 & 1 & 0 & 1 \\ 1 & 1 & 1 & 1 & 1 \\ 0 & 0 & 1 & 1 & 1 \\ 0 & 1 & 1 & 1 & 1 \end{bmatrix}, y_{aw} = \begin{bmatrix} 1 \\ 1 \\ 1 \\ 1 \\ 1 \\ 1 \\ 1 \end{bmatrix}$$

We combine the two matrices $D_Z$ and $D_W$, where either the Zeros or Ones matrix is on the top and, correspondingly, the Ones or Zeros matrix is on the bottom. The combination matrix has N rows. The number of columns is the number of selected predictor attributes in G, i.e., K=|G|. The target vector has N/2 0's (or 1's, if the Ones matrix is on top) followed by N/2 1's (or 0's if the Zero's matrix is at the bottom). The combination matrix, denoted D, is called the difference matrix, and $y_a$ is the corresponding target vector, as shown below.

$$D = \begin{bmatrix} 1 & 0 & 0 & 0 & 1 \\ 0 & 0 & 0 & 0 & 1 \\ 0 & 0 & 0 & 1 & 0 \\ 1 & 0 & 0 & 0 & 1 \\ 0 & 0 & 0 & 0 & 0 \\ 1 & 0 & 1 & 0 & 1 \\ 0 & 0 & 1 & 0 & 1 \\ 1 & 1 & 1 & 0 & 1 \\ 1 & 1 & 0 & 0 & 1 \\ 1 & 1 & 0 & 1 & 0 \\ 1 & 0 & 1 & 0 & 1 \\ 1 & 1 & 1 & 1 & 1 \\ 0 & 0 & 1 & 1 & 1 \\ 0 & 1 & 1 & 1 & 1 \end{bmatrix} y_a = \begin{bmatrix} 0 \\ 0 \\ 0 \\ 0 \\ 0 \\ 0 \\ 0 \\ 1 \\ 1 \\ 1 \\ 1 \\ 1 \\ 1 \\ 1 \end{bmatrix}$$

In various embodiments, a predictor function is built using the N×K matrix D. The objective of the predictor function is to guess the correct target value most of the time. Different embodiments employ different techniques, such as logistic regression, support vector machine, artificial neural network, decision tree, etc., that are discussed above. The validation and use of an example predictor function $f$ stated as $y = X\beta + \varepsilon$ is described below.

Consider, an example $\beta = [0.031\ \ 0.449\ \ 0.333\ \ 0.156\ \ 0.031]^T$. Applying this $\beta$ to the difference matrix D, we obtain the predicted y, denoted $y_p$ as:

$$y_p = D\beta$$
$$= [.062\ \ .031\ \ .156\ \ .062\ \ 0.364\ \ .364\ \ .844\ \ .511\ \ .636\ \ .395\ \ 1.520\ \ .969]^T$$

The class "1," indicating a new device/app is predicted if only if the probability $y_{pi}$ for i=1 . . . N, is greater than 0.5; otherwise, class "0," indicating a returning device, is predicted. Accordingly, $y_p$ can be written as: $[0\ 0\ 0\ 0\ 0\ 0\ 0\ 1\ 1\ 1\ 0\ 1\ 1\ 1]^T$. In comparison with the actual $y_a$, this predictor thus correctly determined the classes of devices/apps in 13 of the 14 cases. As such, using the training set, the accuracy of the predictor function derived using the training set is estimated to be approximately 92.9%. We can further refine the accuracy estimate via cross validating using a test or validation set described above.

After a predictor function is built, it can be applied against difference vectors obtained from uncharacterized observations. The use of the predictor function in classifying a device/app typically does not involve the use of the training and/or test data sets. As an example, suppose we observe a device/app instance having attributes: <a,45,23,xy,z>, and then we receive another observation, and obtain the attribute tuple: <b,12,0,abc,q> from that observation. From these attribute tuples, we build the difference vector: [1,1,1,1,1].

The predictor function applied to this difference vector yields a probability value of approximately 1. As this result is greater than 0.5, the predictor function predicts that the two devices/app instances are different, as shown in the table below.

| Previous | New | Difference | Prediction Calculation | Prediction |
|---|---|---|---|---|
| <a, 45, 23, xy, z> | <b, 12, 0, abc, q> | <1, 1, 1, 1, 1> | 1 | 1 |

Next, suppose we receive another observation that yields the attribute tuple: <a,45,0,xy,X>. We can build two difference vectors against the two previous observations as: [0,0,1,0,1] and [1,1,0,1,1]. Applying the predictor to these two new difference vectors yields 0.365 and 0.667, respectively. As such, the predictor function predicts that the third observation may be from the same device/app from which the first observation, corresponding to the attribute tuple <a,45,23,xy,z>, was received. The predictor function also predicts that the third observation was received from a device/app that is different from the device/app from which the second observation, corresponding to the attribute tuple <b,12,0,abc,q>, was received. As such, the table above can be updated as:

| Previous | New | Difference | Prediction Calculation | Prediction |
|---|---|---|---|---|
| <a, 45, 23, xy, z> | <a, 45, 0, xy, X> | <0, 0, 1, 0, 1> | 0.364 | 0 |
| <b, 12, 0, abc, q> | <a, 45, 0, xy, X> | <1, 1, 0, 1, 1,> | 0.667 | 1 |

The process of updating the table above can be repeated for additional observations by building difference vectors against one or more of the attribute tuples based on the previously received observations, and by applying the predictor function to the newly generated difference vectors.

In some embodiments, the number of difference vectors generated is reduced. Since the number of observations can be large, it may be inefficient to compare the attribute tuple derived from a newly received observation against all of the previously generated attribute tuples that are based on the previously received observations, to generate several difference vectors. Therefore, in some embodiments, we use the recipe fingerprint computation (also called the base fingerprint computation) to divide the previously received observations and the corresponding attribute tuples into bins. Suppose there are a total of J+K attributes, where J attributes are the recipe attributes (also called base-fingerprint attributes), and K attributes are the predictor attributes. When we receive a new observation, instead of building the difference vectors by comparing the new attribute tuple that is derived from the new observation with all previously generated attribute tuples, in some embodiments we compute a base fingerprint using the J recipe attributes of the new attribute tuple. We compare the new attribute tuple only against those previous attribute tuples for which the respective J recipe attributes of the previous attribute tuples yield the same base fingerprint that is associated with the new attribute tuple.

As such, in some embodiments we first compute the base fingerprint over the J recipe attributes of the previous attribute tuples and the new attribute tuple. In some embodiments, when a new attribute tuple is generated from a new observation, the base fingerprint is computed only for the new attribute tuple; the base fingerprints for the previous attribute tuples are computed previously and are stored in the table. The previous attribute tuples are divided into bins, where each bin is associated with a respective base fingerprint that is common to all of the attribute tuples in that bin, as the table below illustrates.

| Recipe attributes | Predictor Attributes | Observed recipe attributes | Observed predictor attributes | Difference | Prediction Calculation | Prediction |
|---|---|---|---|---|---|---|
| <alpha, beta, delta> | <a, 92, 14, xy, f> | | | | | |
| <alpha, beta, delta> | <b, 45, 14, xy, g> | | | | | |
| <alpha, beta, delta> | <a, 12, 13, za, f> | | | | | |
| <gamma, alpha, sigma> | <a, 12, 0, aa, g> | <gamma, alpha, sigma> | <b, 12, 0, cq, g> | <1, 0, 0, 1, 0> | 0.187 | 0 |
| <gamma, alpha, sigma> | <a, 78, 0, cq, f> | <gamma, alpha, sigma> | <b, 12, 0, cq, g> | <1, 1, 0, 0, 1> | 0.511 | 1 |

Specifically, the table above shows two bins where the first bin includes three rows with recipe attribute values <alpha,beta,delta>. One particular base fingerprint is associated with these three rows. The second bin includes two rows with recipe attribute values <gamma,alpha,sigma>. A different particular base fingerprint is associated with these two rows.

The recipe attributes for the next observation are <gamma,alpha,sigma>. Since the recipe attribute tuple for the next observation matches the recipe attribute tuples for the final two rows of the table, we compute the difference vector for predictor attributes of the final two rows only. It should be understood that in some embodiments, the bins or partitions are logical entities, i.e., the rows of the table are not necessary grouped based on the values of the recipe attributes or the base fingerprints. The comparisons are performed with predictor attribute tuples of the previous attribute tuples where the base fingerprint associated with the tuples (or the values of recipe attributes) match with the base fingerprint (or the recipe attribute values) of the new attribute tuple. This can save computation time by avoiding the comparison of the predictor attributes derived from the new observation with the predictor attribute tuples associated with the first three rows. For the previous attribute tuples that are selected for comparison, difference vectors are generated, and prediction is performed using the predictor function as shown in the table above.

In some embodiments, we calculate the base fingerprint over the recipe attributes by executing a message digest algorithm over the recipe attributes. Each bin may include rows with exactly the same base fingerprint. The message digest algorithm can be SHA-256.

In some embodiments, we compare the new attribute tuple only with those previous attribute tuples in a single bin where all recipe attributes from the new attribute tuple match with the recipe attributes from the previous attribute tuples in that bin. In other embodiments, we compare the new attribute tuple with previous attribute tuples in more than one bins, for example, with any bin which only differs with the new attribute tuple in "s" or fewer recipe attribute values, where s is less than the total number of recipe attributes, i.e., s<J. In some embodiments we perform sampling, i.e., we compare the new attribute tuple with only a subset of the previous attribute tuples in one bin.

In one embodiment we pre-compute a table of $2^K$ mappings from difference vectors to $y_p$. In the example, K=5 because the predictor function uses five predictor attributes. Given $\beta=[0.031\ 0.449\ 0.333\ 0.156\ 0.031]^T$, this table is below. The columns marked diff1, diff2, diff3, diff4, diff5 present all possible values of the difference vector. The column marked D(Beta) shows the cross product of the difference matrix and the vector $\beta$. The final column shows $y_p$. In one embodiment, after computing the difference vector, the predicted value is computed using a lookup table. For example, if the difference vector is <0,0,0,0,1>, table lookup according to the second row of the table directly yields "0" as the prediction, without having to compute D(Beta) explicitly.

| diff1 | diff2 | diff3 | diff4 | diff5 | D(Beta) | $y_p$ |
|---|---|---|---|---|---|---|
| 0 | 0 | 0 | 0 | 0 | 0 | 0 |
| 0 | 0 | 0 | 0 | 1 | 0.031 | 0 |
| 0 | 0 | 0 | 1 | 0 | 0.156 | 0 |
| 0 | 0 | 0 | 1 | 1 | 0.187 | 0 |
| 0 | 0 | 1 | 0 | 0 | 0.333 | 0 |
| 0 | 0 | 1 | 0 | 1 | 0.364 | 0 |
| 0 | 0 | 1 | 1 | 0 | 0.489 | 0 |
| 0 | 0 | 1 | 1 | 1 | 0.52 | 1 |
| 0 | 1 | 0 | 0 | 0 | 0.449 | 0 |
| 0 | 1 | 0 | 0 | 1 | 0.48 | 0 |
| 0 | 1 | 0 | 1 | 0 | 0.605 | 1 |
| 0 | 1 | 0 | 1 | 1 | 0.636 | 1 |
| 0 | 1 | 1 | 0 | 0 | 0.782 | 1 |
| 0 | 1 | 1 | 0 | 1 | 0.813 | 1 |
| 0 | 1 | 1 | 1 | 0 | 0.938 | 1 |
| 0 | 1 | 1 | 1 | 1 | 0.969 | 1 |
| 1 | 0 | 0 | 0 | 0 | 0.031 | 0 |
| 1 | 0 | 0 | 0 | 1 | 0.062 | 0 |
| 1 | 0 | 0 | 1 | 0 | 0.187 | 0 |
| 1 | 0 | 0 | 1 | 1 | 0.218 | 0 |
| 1 | 0 | 1 | 0 | 0 | 0.364 | 0 |
| 1 | 0 | 1 | 0 | 1 | 0.395 | 0 |
| 1 | 0 | 1 | 1 | 0 | 0.52 | 1 |
| 1 | 0 | 1 | 1 | 1 | 0.551 | 1 |
| 1 | 1 | 0 | 0 | 0 | 0.48 | 0 |
| 1 | 1 | 0 | 0 | 1 | 0.511 | 1 |
| 1 | 1 | 0 | 1 | 0 | 0.636 | 1 |
| 1 | 1 | 0 | 1 | 1 | 0.667 | 1 |
| 1 | 1 | 1 | 0 | 0 | 0.813 | 1 |
| 1 | 1 | 1 | 0 | 1 | 0.844 | 1 |
| 1 | 1 | 1 | 1 | 0 | 0.969 | 1 |
| 1 | 1 | 1 | 1 | 1 | 1 | 1 |

In various embodiments, if the predictor function yields a 0 for two rows of the table when compared against a new attribute tuple, the device/app associated with the new attribute tuple is designated as returning. In some embodiments, the final fingerprint of the first of the two rows is selected as the final fingerprint of the returning device/app. In some embodiments, from all rows for which the predictor function yields a 0, one row is selected at random, and the corresponding final fingerprint is designated as the final fingerprint of the returning device/app. In some embodiments, if all predictions yield 1 when the rows of the table are compared against a new attribute tuple derived from a new observation, a few final fingerprint is generated using a random or a pseudo-random number generator, and is associated with the new attribute tuple. In some embodiments, the final fingerprint or another number generated deterministically therefrom is designated as a device and/or software app identifier (ID).

The new software app ID (also called a software instance ID) and/or the final fingerprint may have at least 256 bits of entropy. In some instances, the new software instance ID and/or the final fingerprint is mathematically unrelated to attributes derived from the software application instance data, i.e., the observations obtained from the device and/or the instance of a software app invoked on a device. The entropy of the new software instance ID and/or the final fingerprint may exceed the entropy of all attributes derived from the software application instance data. The software application instance data may be filtered to retain device-related data prior to deriving the attribute tuples.

While the predictor function in the example above is linear, i.e., a linear function was used to compute $y_p$, a non-linear function may also be derived from the training data set and used to compute $y_p$. Example techniques to derive non-linear predictor functions include Decision Tree, Support Vector Machine, etc., as discussed above.

In some embodiments, the difference vectors are not purely binary. For example, the difference vector may express the respective differences in the attribute values as a distance. If normalized, the difference may be a value in the range [0,1]. In some cases, a normalized difference is computed for each predictor attribute, and two attribute values are considered to be the same if the normalized difference is less than 0.5 or another specified threshold. In some embodiments, a linear or non-linear predictor function is applied to a difference vector that includes one or more normalized and/or actual distances respectively corresponding to one or more predictor attributes. In one embodiment, the difference vector can be a combination of binary and distance values, which can be normalized or actual.

In some embodiments, during the training phase using the training set and/or during the testing phase using the test data set, as described above, a candidate prediction function may fail a certain number of rows (attribute tuples, in general) in the training and/or test sets. Various cost functions can be used to characterize this error, and $\beta$ can be updated to minimize or maximize the cost function, thereby to minimize the prediction error. Specifically, the parameter vector $\beta$ can be optimized using either an iterative or a closed form approach. The steps discussed below generally describe three examples on how to optimize $\beta$ from the training set defined as (G, ya), where ya is the dependent vector of the training observations, also known as "y actual" and yp is the predicted y, as discussed above. Let s be a learning rate, and n be the number of training observations, i.e., attribute tuples.

If the cost minimization model is solved using a least mean square method (e.g., batch gradient descent), the following gradient descent update rule can be used:

```
Repeat until convergence {
    β_k := β_k + s Σ_{i=1}^n (ya^i − yp^i) x_k^i  for every k
}
```

The range of subscript k varies from 1 through K, where K is the total number of the G attributes, i.e., the predictor attributes. Note that this method scans the entire training set before an update is made and therefore it is considered to be a batch processing technique. Batch processing techniques can be relatively slow if the number of observations is large.

If the cost minimization model is solved using a stochastic gradient based method (e.g., incremental gradient descent), the following update rule can be used:

```
Loop {
    For i = 1 to n, {
        β_k := β_k + s(ya^i − yp^i) x_k^i
    }
    for every k
}
```

It is important to note that in this examples, the magnitude of the update is proportional to the error term ($ya^i - yp^i$). As such, if we encounter a training example for which the prediction nearly matched the actual value $ya^i$, there is little need to change the parameters; on the other hand, a larger change to the parameters may be made if the prediction $yp^i$ has a large error. Also, unlike the batch gradient descent method, an update is made at every single training attribute tuple that is processed. Therefore, the optimized β can be achieved at a faster rate using this method. In some embodiments, gradient ascent or its derivatives can be used as opposed to gradient descent, where gradient ascent is a cost maximization which can be converted from a gradient descent through negation.

If the cost minimization model is solved using matrix derivatives by finding a closed form solution, the following formulation can be used:

$f: y = X\beta + \varepsilon$

Sum of squared errors (SSE):

$$\sum_{i=1}^{n} \varepsilon^2 = \varepsilon^T \varepsilon = (y - X\beta)^T(y - X\beta) = y^T y - 2y^T X\beta + (X\beta)^T(X\beta)$$

To minimize the SSE:

$$\frac{\partial(\varepsilon^T \varepsilon)}{\partial \beta} = -2y^T X + 2X^T X\beta = 0$$

$$\beta = (X^T X)^{-1} X^T y$$

It is important to note that in order for this closed form solution to be feasible, the matrix $X^T X$ should be invertible. Using this method, the optimized β vector can be found without going through an iterative process.

After a β vector is generated and/or optimized, in some embodiments, for each j-th member of a test set of difference vectors, where the j-th member includes a respective tuple $G^j$ of the values of the G attributes, the result of the discriminant function $f$ is computed using the β vector. If the number of errors is less than a specified threshold, the generated predictor function can be used to classify previously uncharacterized observations received from devices and/or apps.

Unlike any generic operations such as data transmission and reception, unlike usual computer functions such as storage and access of information, and unlike any ordinary mathematical or mental processes such as merely comparing and categorizing information, the operations described herein, are specifically orchestrated and are unconventional. In particular, attributes generated from data received from devices and/or apps are analyzed according to their half lives, and are accordingly designated as stable or unstable. In general, many devices/apps may have communicated with a server in the past. One or more of the stable attributes associated with a device/app that is currently communicating with a server are used to identify from the set of devices/apps that communicated previously a subset of candidate devices/software apps that may be the same as a device/app that is currently communicating with a server. Using a machine learned classification function, a particular device/app which is likely the same as the device/app currently communicating is identified in some cases and, in other cases, it is determined that the device/app currently communicating is not the same as any other device/app in the selected subset.

Conventional techniques generally do not employ unstable attributes in device authentication and/or do not classify attributes into two classes and then use the two classes for different kinds of analysis, as described herein. Various operations described herein that are performed to generate classifier functions via machine learning and/or to analyze a device/app using a classifier function, depend on data obtained from devices and/or apps and, as such, the techniques descried herein are deeply rooted in communication and computation techniques for device and/or app identification and authorization.

As such, one technical effect of various embodiments described herein is to effectively and accurately distinguish between devices that have previously communicated with a server and those that are communicating for the first time. Another technical effect of various embodiments is to determine whether or not a particular software app installed on a device has communicated with a server previously. Such classification of devices and/or determination regarding software apps installed on devices can improve user authentication e.g., by increasing the reliability of user authentication, by increasing the speed of user authentication, and/or by minimizing the number of communications and/or processing steps involved in user authentication.

The various embodiments and features described herein may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the claims presented below and their legal equivalents.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method comprising:

receiving, by a server, software application instance data from a device executing a current software application instance;

generating a set of attributes from the software application instance data associated with the current software application instance executing on the device;

selecting a set of base-fingerprint attributes from the set of attributes based at least in part on an estimated half-life of a respective attribute and an entropy of the respective attribute, the estimated half-life for the respective attribute included in the set of base-fingerprint attributes meeting or exceeding a predefined half-life threshold, and the estimated half-life being based at least in part on a date of change associated with the respective attribute;

selecting a set of current software application instance predictor attributes from a remaining set of attributes of the set of attributes following selection of the set of base-fingerprint attributes;

discarding any attributes from the remaining set of attributes that fail to be included in the set of current software application instance predictor attributes;

selecting, by the server, from a database, a record of a candidate software application instance corresponding to a base fingerprint correlated to the set of base-fingerprint attributes, wherein the record comprises a plurality of candidate software application instance predictor attributes of the candidate software application instance;
obtaining, by the server, a predictor function derived via adaptive analysis of software application instance data of other previously executed software instances, wherein the predictor function is associated with:
i) a plurality of difference vectors, each vector indicative of value differences between the plurality of candidate software application instance predictor attributes, and
ii) a plurality of match indicators, each match indicator paired to a difference vector from the plurality of difference vectors;
computing, by the server, a set of difference values by comparing the set of current software application instance predictor attributes with the plurality of candidate software application instance predictor attributes; and
determining, by the server, a final match indicator by applying the predictor function to the set of difference values, wherein the final match indicator identifies a match to determine when the current software application instance is a returning software application instance or a new software application instance.

2. The method of claim 1, wherein the obtained predictor function is derived via adaptive analysis that is iterative.

3. The method of claim 1, wherein each predictor attribute from the set of current software application instance predictor attributes has a half-life less than the redefined half-life threshold.

4. The method of claim 1, further comprising:
receiving, at the server, the software application instance data from a device executing the current software application instance, the software application instance data corresponding to an invocation of a software application on the device.

5. The method of claim 4, further comprising:
computing the base fingerprint using the set of base-fingerprint attributes.

6. The method of claim 5, wherein:
each predictor attribute from the set of current software application instance predictor attributes has a half-life less than the predefined half-life threshold.

7. The method of claim 1, further comprising:
when the final match indicator indicates a new software application instance:
designating the current software application instance associated with the software application instance data as a new software application instance;
generating a new software instance identifier; and
adding to the database a new record comprising the new software instance identifier, the set of base-fingerprint attributes based on the software application instance data and the set of current software application instance predictor attributes based on the software application instance data.

8. The method of claim 1, further comprising replacing at least one candidate software application instance predictor attribute with a current software application instance predictor attribute from the set of current software application instance predictor attributes.

9. The method of claim 7, wherein the new software instance identifier is computed using a pseudo-random number generator or a random number generator.

10. The method of claim 7, wherein the new software instance identifier has at least 256 bits of entropy.

11. The method of claim 7, wherein the new software instance identifier is mathematically unrelated to attributes derived from the software application instance data.

12. The method of claim 7, wherein entropy of the new software instance identifier exceeds entropy of all attributes derived from the software application instance data.

13. The method of claim 1, wherein the current software application instance comprises a browser instance and an app instance.

14. The method of claim 1, further comprising:
filtering the software application instance data to retain device-related data;
generating by the server from the device-related data the set of current software application instance predictor attributes based on device-related data; and
when the final match indicator indicates a faded match:
designating the device as a new device;
generating a new device identifier; and
adding to the database a new record comprising the new device identifier, the set of base-fingerprint attributes based on the device-related data and the set of current software application instance predictor attributes based on the device-related data; and
when the final match indicator indicates a successful match:
designating the device as a returning device.

15. The method of claim 1, wherein obtaining the predictor function comprises:
generating based on at least in part on the software application instance data of other previously executed software instances, the plurality of difference vectors and a target vector, wherein;
each difference vector from the plurality of difference vectors comprises a plurality of difference elements, each difference element corresponding to a respective attribute of software application instances from the software application instance data of other previously executed software application instances, and
each difference vector corresponds to a respective element of the target vector, and to a pair of software application instance observations;
applying the predictor function to the plurality of difference vectors to obtain a prediction vector;
computing an aggregate error based on difference between the prediction vector and the target vector;
modify the predictor function by modifying a predictor function parameter to decrease the aggregate error; and
designating the modified predictor function as the predictor function.

16. A system comprising:
a processor; and
a memory in communication with the processor, the memory comprising instructions which, when executed the processor, cause the processor to:
receive, by a server, a software application instance data from a device executing a current software application instance;
generate a set of attributes from the software application instance data associated with the current software application instance executing on the device;
select a set of base-fingerprint attributes from the set of attributes based at least in part on an estimated half-life of a respective attribute and an entropy of the respective attribute, the estimated half-life of the respective attribute included in the set of base-fingerprint attributes meeting or based at least in part on a date of change associated with the respective attribute;

select a set of current software application instance predictor attributes from a remaining set of attributes of the set of attributes following selection of the set of base-fingerprint attributes;

discard any attributes from the remaining set of attributes that fail to be included in the set of current software application instance predictor attributes;

select, from a database, a record of a candidate software application instance corresponding to a base fingerprint correlated to the set of base-fingerprint attributes, wherein the record comprises a plurality of candidate software application instance predictor attributes of the candidate software application instance;

obtain a predictor function derived via adaptive analysis of other software application instance data of other previously executed software instances, wherein the predictor function is associated with:
i) a plurality of difference vectors, each vector indicative of value differences between the plurality of candidate software application instance predictor attributes; and
ii) a plurality of match indicators, each match indicator paired to a difference vector from the plurality of difference vectors;

compute a set of difference values by comparing the set of current software application instance predictor attributes with the plurality of candidate software application instance predictor attributes; and determine a final match indicator by applying the predictor function to the set of difference values wherein the final match indicator identifies a match to determine when the current software application instance is a returning software application instance, or a new software application instance.

17. The system of claim 16, wherein the obtained predictor function is derived via adaptive analysis that is iterative.

18. The system of claim 16, wherein each predictor attribute from the set of current software application instance predictor attributes has a half-life less the predefined half-life threshold.

19. The system of claim 16, wherein the instructions further cause the processor to:
receive the software application instance data from a device executing a current software application instance, the software application instance data corresponding to an invocation of a software application on the device.

20. The system of claim 19, wherein the instructions further cause the processor to:
compute the base fingerprint using the set of base-fingerprint attributes.

21. The system of claim 20, wherein:
each predictor attribute from the set of current software application instance predictor attributes has a half-life less than the predefined half-life threshold; and
each base-fingerprint attribute from the set of base-fingerprint attributes has a half-life at least equal to the predefined half-life threshold.

22. The system of claim 16, wherein the instructions further cause the processor to:
when the final match indicator indicates a new software application instance:
designate the current software application instance associated with the software application instance data as a new software application instance;
generate a new software instance identifier; and
add to the database a new record comprising the new software instance identifier, the set of base-fingerprint attributes based on the software application instance data and the set of current software application instance predictor attributes based on the software application instance data.

23. The system of claim 16, wherein the instructions further cause the processor to replace at least one candidate software application instance predictor attribute with a current software application instance predictor attribute from the set of current software instance predictor attributes.

24. The system of claim 22, wherein the instructions further cause the processor to compute the new software instance identifier using a pseudo-random number generator or a random number generator.

25. The system of claim 22, wherein the new software instance identifier has at least 256 bits of entropy.

26. The system of claim 22, wherein the new software instance identifier is mathematically unrelated to attributes derived from the software application instance data.

27. The system of claim 22, wherein entropy of the new software instance identifier exceeds entropy of all attributes derived from the software application instance data.

28. The system of claim 16, wherein the current software application instance comprises at least one of a browser instance and an app instance.

29. The system of claim 16, wherein the instructions further cause the processor to:
filter the software application instance data to retain device-related data;
generate from the device-related data the set of current software application instance predictor attributes based on device-related data; and
when the final match indicator indicates a faded match:
designate the device as a new device;
generate a new device identifier; and
add to the database a new record comprising the new device identifier, the set of base-fingerprint attributes based on the device-related data and the set of current software application instance predictor attributes based on the device-related data; and
when the final match indicator indicates a successful match:
designate the device as a returning device that is associated with the record.

30. The system of claim 16, wherein to obtain the predictor function the instructions further cause the processor to:
generate based on at least in part the software application instance data of other previously executed software instances, the plurality of difference vectors and a target vector, wherein:
each difference vector from the plurality of difference vectors comprises a plurality of difference elements, each difference element corresponding to a respective attribute of software application instances from the software application instance data of other previously executed software instances, and
each difference vector corresponds to a respective element of the target vector, and to a pair of software application instance observations;
apply the predictor function to the plurality of difference vectors to obtain a prediction vector;
compute an aggregate error based on difference between the prediction vector and the target vector;

modify the predictor function by modifying a function parameter to decrease the aggregate error; and designate the modified predictor function as the predictor function.

\* \* \* \* \*

UNITED STATES PATENT AND TRADEMARK OFFICE
CERTIFICATE OF CORRECTION

PATENT NO. : 11,093,852 B2
APPLICATION NO. : 15/297889
DATED : August 17, 2021
INVENTOR(S) : Benson et al.

Page 1 of 1

It is certified that error appears in the above-identified patent and that said Letters Patent is hereby corrected as shown below:

In the Claims

In Column 35, Line 30, replace "redefined" with --predefined--.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*